(12) United States Patent  (10) Patent No.: US 8,690,232 B2
Fujita  (45) Date of Patent: Apr. 8, 2014

(54) FRONT PILLAR FOR AUTOMOBILE

(71) Applicant: Honda Motor Co., Ltd., Tokyo (JP)

(72) Inventor: Hiroshi Fujita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 13/869,358

(22) Filed: Apr. 24, 2013

(65) Prior Publication Data

US 2013/0234471 A1    Sep. 12, 2013

Related U.S. Application Data

(62) Division of application No. 13/002,379, filed as application No. PCT/JP2009/061830 on Jun. 29, 2009, now Pat. No. 8,444,211.

(30) Foreign Application Priority Data

| Jul. 4, 2008 | (JP) | 2008-176237 |
|---|---|---|
| Jul. 4, 2008 | (JP) | 2008-176245 |
| Jul. 4, 2008 | (JP) | 2008-176261 |
| Jul. 4, 2008 | (JP) | 2008-176278 |
| Jul. 4, 2008 | (JP) | 2008-176282 |
| Jul. 4, 2008 | (JP) | 2008-176321 |

(51) Int. Cl.
    *B62D 25/04*    (2006.01)
(52) U.S. Cl.
    USPC ............... 296/193.06; 296/187.09; 296/84.1; 296/96.21
(58) Field of Classification Search
    USPC .................. 296/193.06, 187.09, 203.02, 208, 296/146.11, 84.1, 96.21
    IPC ......................................................... B62D 25/04
    See application file for complete search history.

(56) References Cited

U.S. PATENT DOCUMENTS

| 3,198,572 | A |   | 8/1965 | Stolarczyk |
|---|---|---|---|---|
| 4,957,326 | A |   | 9/1990 | Chiba et al. |
| 5,586,799 | A |   | 12/1996 | Kanemitsu et al. |
| 5,791,716 | A | * | 8/1998 | Takagi et al. ............... 296/39.1 |
| 5,833,303 | A |   | 11/1998 | Kawai et al. |
| 5,941,597 | A |   | 8/1999 | Horiuchi et al. |
| 6,042,176 | A |   | 3/2000 | Ikeda et al. |
| 6,179,359 | B1 |  | 1/2001 | Clauson et al. |

(Continued)

FOREIGN PATENT DOCUMENTS

| JP | 02-21148 | 2/1990 |
|---|---|---|
| JP | H03-055051 | 4/1991 |

(Continued)

*Primary Examiner* — Glenn Dayoan
*Assistant Examiner* — Pinel Romain
(74) *Attorney, Agent, or Firm* — Rankin, Hill & Clark LLP

(57) ABSTRACT

A front pillar for an automobile includes an outer panel, an inner panel, a hollow member sandwiched between the outer and inner panels, and a reinforcing member. The outer panel has a glass attachment flange section extending along an edge of the windshield. The hollow member has a first concave section provided on an upper wall section at a terminal end of the hollow member. The first concave section is downwardly separated from the glass attachment flange section of the outer panel. The reinforcing member has a second concave section welded to the first concave section and downwardly separated from the glass attachment flange section of the outer panel.

2 Claims, 31 Drawing Sheets

(56) References Cited

U.S. PATENT DOCUMENTS

| | | |
|---|---|---|
| 6,322,134 B1 | 11/2001 | Yang |
| 6,340,200 B1 * | 1/2002 | Enomoto et al. .......... 296/187.09 |
| 6,460,920 B1 | 10/2002 | Reinsch |
| 6,517,144 B2 | 2/2003 | Kobayashi |
| 6,550,847 B2 | 4/2003 | Honda et al. |
| 6,554,350 B2 | 4/2003 | Takahara |
| 6,595,579 B2 | 7/2003 | Freitag et al. |
| 6,692,065 B2 | 2/2004 | Yamamoto et al. |
| 6,698,823 B2 | 3/2004 | Kim |
| 6,705,669 B1 | 3/2004 | Pearcy et al. |
| 7,168,756 B2 | 1/2007 | Hasegawa et al. |
| 7,360,825 B2 * | 4/2008 | Yoshioka et al. ......... 296/203.03 |
| 7,828,357 B2 | 11/2010 | Hayashi et al. |
| 7,988,182 B2 * | 8/2011 | Park ............................ 280/728.2 |
| 8,210,602 B2 | 7/2012 | Kobayashi et al. |
| 2001/0019214 A1 | 9/2001 | Takahara |
| 2001/0019215 A1 | 9/2001 | Takahara |
| 2001/0040392 A1 | 11/2001 | Yoshida |
| 2004/0201258 A1 | 10/2004 | Daniere et al. |
| 2005/0088012 A1 | 4/2005 | Yoshida |
| 2006/0012220 A1 | 1/2006 | Luik et al. |
| 2006/0255624 A1 | 11/2006 | Zimmerman et al. |
| 2008/0052908 A1 | 3/2008 | Reed et al. |
| 2009/0167056 A1 | 7/2009 | Moore et al. |

FOREIGN PATENT DOCUMENTS

| | | |
|---|---|---|
| JP | 09-156536 | 6/1997 |
| JP | 11-011344 | 1/1999 |
| JP | 2001-026247 | 1/2001 |
| JP | 2001-151150 | 6/2001 |
| JP | 2001-328560 | 11/2001 |
| JP | 2003-072589 | 3/2003 |
| JP | 2006-018209 | 1/2006 |
| JP | 2007-196715 | 8/2007 |

* cited by examiner

FRONT PILLAR FOR AUTOMOBILE

TECHNICAL FIELD

The present invention relates to a front pillar for an automobile and, more particularly, to an automobile front pillar having a hollow member provided with an outer panel.

BACKGROUND ART

Left and right front pillars in an automobile are located in a front section of the automobile, and are provided in order to attach a windshield (i.e., a windscreen). Commonly, a front pillar is made as a member having a closed cross section by welding together an outer panel and an inner panel in an overlapping manner. A front pillar of such description is known from Patent Literature 1. Each of the outer panel and the inner panel requires a flange for joining the other. The flange projects outwards from the front pillar. Therefore, the size of the flange increases.

In response, front pillar development has been in progress in recent years. A front pillar using a hollow member integrally formed by hydroforming is known from Patent Literature 2. The front pillar known from Patent Literature 2 comprises the hollow member and an outer panel. The hollow member comprises a pipe formed by hydroforming. The outer panel is provided so as to cover a surface of the hollow member on the outside in the vehicle width direction, and joined. The front pillar known from Patent Literature is smaller than a common front pillar described further above. The visibility range forward of a vehicle body from a passenger compartment (i.e., the visual field) is accordingly larger.

Depending on the model of the automobile, a front pillar may have a curved shape, the entirety of which projects to an outside of a vehicle body, from the viewpoint of design. Even in an instance in which a curved front pillar is used, it is preferable that the pillar exhibits a stiffness equivalent to an instance in which a linear front pillar is used. Increasing the wall thickness or the diameter of the hollow member is one possible method for achieving this. However, there remains the possibility that the weight of the front pillar will increase. There is also a possibility that an increase in the diameter of the hollow member will result in a correspondingly narrower field of view from the passenger compartment.

PRIOR ART REFERENCES

Patent Literature

Patent Literature 1: Japanese Utility Model Application Laid-Open Publication No. H03-44051
Patent Literature 2: Japanese Patent Application Laid-Open Publication No. 2006-182079

SUMMARY OF THE INVENTION

Problem Sought to be Solved by the Invention

It is an object of the present invention to provide a technique for increasing the stiffness of a front pillar while minimizing the weight of the front pillar.

Means for Solving the Problem

According to the present invention, there is provided a front pillar for an automobile, which front pillar comprises: a hollow member; an outer panel; and an inner panel, wherein the hollow member has a curved shape protruding in its entirety to outside of a vehicle body, the outer panel is provided to a wall section of the hollow member, the wall section being on a vehicle exterior side, and the inner panel is formed so as to lie along a wall section of the hollow member, the wall section being on a passenger compartment side, and the inner panel is provided to the wall section on the passenger compartment side.

Preferably, the inner panel has a restricting concave section, and the restricting concave section fits onto a part of the hollow member, thereby restricting a relative displacement of the hollow member in a vehicle width direction relative to the inner panel.

Preferably, each of the outer panel and the inner panel has a first flange for overlapping the other. Each of the first flanges in a state of overlapping the other also functions as a seal attachment section for attaching a sealing material. The sealing material is a member capable of sealing a side door when the side door is in a state of being closed on the vehicle body.

Preferably, each of the outer panel and the inner panel has a second flange provided to a portion opposite each of the respective first flanges in relation to the hollow member. The second flange of the outer panel and the second flange of the inner panel are provided separately to the hollow member.

Preferably, the first flange of the outer panel and the first flange of the inner panel overlap each other so that joining using direct spot welding is possible; the second flange of the outer panel overlaps the hollow member so that joining using indirect spot welding from an outer panel side is possible; and the second flange of the inner panel overlaps the hollow member so that joining using MIG welding (metal inert gas welding) is possible.

Preferably, an intermediate portion of the inner panel between the first flange and the second flange overlaps the hollow member so that joining using MIG welding is possible.

Preferably, the outer panel has a roof-joining outer flange section that protrudes further towards a passenger compartment relative to the hollow member; the hollow member has a roof-joining extended flange section that protrudes towards the passenger compartment along the roof-joining outer flange section; and the roof-joining extended flange section and the roof-joining outer flange section overlap a flange section of a roof so that joining by direct spot welding is possible.

More preferably, each of the inner panel and the outer panel has a flange overlapping and joined by direct spot welding to a portion of the hollow member that is located opposite the roof.

More preferably, the front pillar further comprises a nut into which a bolt can be screwed from the passenger compartment side, the nut positioned between the hollow member and the inner panel. The nut comprises a plate section for joining to the inner panel, and a nut section that is smaller than the plate section. The nut section projects towards an inside of the hollow member through a nut relief hole section formed on the hollow member.

More preferably, the nut relief hole section is oriented at an incline relative to a center line of the nut section.

Preferably, each of the outer panel and the inner panel has a first flange and a second flange. Each of the respective second flanges is joined separately to the hollow member. Each of the first flanges is positioned so as to face the other. A reinforcing member is sandwiched between and joined to the first flanges in a front end section and a rear end section of the front pillar. Between the front end section and the rear end section, each of the first flanges is overlapped with the other so that a sealing material for sealing the side door can be attached, the first flanges are partially provided with a gap therebetween, and each of the first flanges is joined to the other at a portion where the gap is not present, wherein the gap is in communication with a closed void section enclosed by the hollow member, the outer panel, and the inner panel.

More preferably, the gap comprises a concave section formed on a flange surface of at least one of the first flanges.

More preferably, each of the front and rear reinforcing members is also joined to the hollow member within the void section.

More preferably, the outer panel has a glass attachment flange section that is overlapped with and joined to an upper surface of the hollow member. The glass attachment flange section is formed in a flat plate shape on which a windshield can be attached. A terminal section of the hollow member in the longitudinal direction is reinforced by a reinforcing member. The reinforcing member has a joint portion that is overlapped with and joined to the upper surface of the hollow member in the terminal section. The joint portion and the upper surface of the terminal section are downwardly separated from the glass attachment flange section.

More preferably, the terminal section is sandwiched between, and joined to, the reinforcing member and the inner panel.

More preferably, a thickness of the hollow member and a thickness of the reinforcing member are of a magnitude suited for joining using MIG welding.

Preferably, the inner panel has, on a lower section, a stepped bead bulging towards the passenger compartment and an opening section penetrating in the vehicle width direction. The stepped bead has a plurality of fold sections formed on the inner panel so as to extend towards a rear section of the vehicle body along the hollow member. The opening section is a through-hole through which a flexible linear member drawn out from an interior of the hollow member can be drawn towards the passenger compartment. The through-hole is positioned so as to span at least a part of the fold sections, whereby an upper half portion of the through-hole is positioned on a section corresponding to the stepped bead.

More preferably, the inner panel has a stepped section for reinforcement, surrounding a rim of the opening section.

More preferably, the stepped bead is configured so that a front end section bulges maximally from the inner panel, and the degree of bulging gradually decreases towards the rear section of the vehicle body.

Advantageous Effects of the Invention

According to the present invention, the hollow member has a curved shape, the entirety of which projects to the outside of the vehicle body. On the hollow member, an inner panel is overlapped with and joined to the wall section on the passenger compartment side. In other words, the hollow member is reinforced by the inner panel. The hollow member with increased stiffness can transmit impact load acting on the inner panel towards the rear section of the vehicle body in an efficient manner. There is no need to increase the thickness or the wall thickness of the hollow member in order to increase the stiffness of the hollow member. An increase in the weight of the front pillar can be minimized, and the size of the front pillar can be reduced. Reducing the size of the front pillar expands the visual field from the passenger compartment.

Furthermore, according to the present invention, the restricting concave section is fitted onto a part of the hollow member, thereby making it possible to restrict a relative displacement of the hollow member in the vehicle width direction relative to the inner panel. Therefore, the hollow member is reinforced by the inner panel. As a result, the stiffness of the hollow member can be increased. Therefore, impact load acting on the front end of the hollow member can be transmitted towards the rear section of the vehicle body in an efficient manner.

Furthermore, according to the present invention, the first flange of the outer panel and the first flange of the inner panel overlap each other in the vicinity of the lower section of the hollow member. The stiffness of the front pillar therefore increases. It is also possible for the respective first flanges to form a rim section of a door opening. The sealing material for sealing the door opening can be attached to the rim section. In other words, the rim section also functions as the seal attachment section. The sealing material can be adequately supported by the seal attachment section having a high stiffness.

Furthermore, according to the present invention, neither of the second flanges overlaps the other, making it possible to reduce the size of each of the outer panel and the inner panel by a corresponding amount. Therefore, the size and the weight of the front pillar can be reduced.

Furthermore, according to the present invention, each of the first flange of the outer panel and the first flange of the inner panel can be overlapped with the other and joined by direct spot welding. The second flange of the outer panel can be joined to the hollow member by indirect spot welding from the outer panel side. The second flange of the inner panel can be joined to the hollow member by MIG welding. Welding means suitable for the configuration of each joint section can be employed as described above, and a step for joining by welding can be performed in an efficient manner; therefore, the capacity for mass production of the front pillar can be improved.

Furthermore, according to the present invention, the intermediate portion of the inner panel between the first flange and the second flange can be joined to the hollow member by MIG welding. Both the second flange and the intermediate portion of the inner panel is joined to the hollow member, thereby making it possible to further increase the stiffness of the hollow member.

Furthermore, according to the present invention, three flanges; namely, the roof-joining extended flange section, the roof-joining outer flange section, and the flange section of the roof, can be overlapped with each other and joined by direct spot welding. Therefore, despite a hollow member being used for the front pillar, the specifications of the spot welding equipment can be substantially equivalent to those required conventionally, and it becomes possible to continue reducing the size of spot welding equipment. Also, even when a hollow member is used, welding conditions required for spot welding are substantially identical to those required conventionally, and spot welding can be readily performed. Only the roof-joining outer flange section and the roof-joining extended flange section for attaching the flange section of the roof protrude towards the passenger compartment. There is no need to provide a roof-joining outer flange section and a roof-joining extended flange section to a portion of the front pillar onto which the windshield is attached. Therefore, it is possible to provide an adequate visibility range forward of the vehicle body from the passenger compartment through the windshield.

Furthermore, according to the present invention, the outer panel and the inner panel are joined by overlapping respective flanges and applying direct spot welding at a position opposite the roof relative to the hollow member. Therefore, even though a hollow member is used, it is possible to employ spot welding, as conventionally employed, when joining the inner panel and the outer panel.

Furthermore, according to the present invention, the nut is provided between the hollow member and the inner panel. The nut comprises the plate section that joins the inner panel, and the nut section that is smaller than the plate section. The nut section extends to the interior of the hollow member through a nut relief hole section formed on the hollow member. Therefore, even though a nut is provided between the hollow member and the inner panel, a space between the hollow member and the inner panel can be made narrower. As a result, the front pillar can be made thinner. Also, since the nut section is smaller than the plate section, the size of the nut relief hole can be made smaller by a corresponding amount.

Furthermore, according to the present invention, the nut relief hole section is oriented at an incline relative to the center line of the nut section. Therefore, even when a plate nut is attached in advance when the inner panel is attached, an adequate space between the plate nut and the nut relief hole section can readily be provided, and the size of the nut relief hole section can be further reduced.

Furthermore, according to the present invention, the hollow member, the outer panel, and the inner panel are combined to form a closed space section. A gap in communication with the space section is partially provided between each of the first flanges. The gap functions as a channel used when performing surface treatment on the front pillar using an electrodeposition liquid or another coating liquid. The coating liquid is caused to flow from the gap into the space section, thereby making it possible to adequately coat a wall surface of the front pillar inside the space section. Also, since a respective portion of each of the first flanges where the gap is not present is joined to the other, the first flanges can be imparted with adequate stiffness even though the gap is provided. As a result, adequate stiffness of the front pillar can be obtained. Also, the reinforcing member is provided to the front end section and the rear end section of the front pillar. Each of the reinforcing members is sandwiched between and joined to each of the first flanges. Therefore, the front end section and the rear end section of the front pillar, which require higher stiffness than an intermediate section, can be reinforced by the reinforcing member. Therefore, the hollow member having a small diameter and a small wall thickness can be used to make the front pillar extremely compact.

Furthermore, according to the present invention, the gap comprises a concave section formed on the flange surface of at least one of the first flanges. Since the concave section is formed on the flange surface, the concave section can be simultaneously formed during plastic forming of the first flange. Therefore, the gap can be provided to the flange surface with extreme ease. It is also possible to readily provide a large number of gaps across a wide range on the flange surface.

Furthermore, according to the present invention, the reinforcing member sandwiched by and joined to each of the first flanges and is also joined to the hollow member. Therefore, the front end section and the rear end section of the hollow member can be reinforced by both the inner panel and the reinforcing member. The stiffness of the hollow member is increased, and the stiffness of the front pillar can therefore be further increased.

Furthermore, according to the present invention, the reinforcing member for reinforcing each of the terminal sections of the hollow member has a joint portion for overlapping with and joining to the upper surface of each of the terminal sections. The joint portion and the upper surface of each of the terminal sections are downwardly separated from the glass attachment flange section, and therefore do not interfere with the glass attachment flange section. Therefore, the glass attachment flange section can be given a flat configuration overall. The windshield can be readily and reliably attached to the flat glass attachment section using an adhesive or another common method of attachment, and the state of the attachment can be maintained to a sufficient degree.

Furthermore, according to the present invention, the terminal section is sandwiched by and joined to the reinforcing member and the inner panel, and the joint strength is therefore increased.

Furthermore, according to the present invention, each of the thickness of the hollow member and the thickness of the reinforcing member is set to a size that is suitable for joining by MIG welding. Therefore, the hollow member and the reinforcing member can be sufficiently joined, and the joint strength can be increased.

Furthermore, according to the present invention, the inner panel has a stepped bead bulging towards the passenger compartment, and the stiffness of the inner panel thereby increases. As a result, the front pillar has high stiffness. Also, the opening section is positioned so as to span at least a part of the fold sections, and the upper half portion of the opening section is thereby positioned on a section corresponding to the stepped bead. Therefore, the opening section is formed so as to have a stepped shape that matches a gradation of the stepped bead. Therefore, the flexible linear member drawn out from the interior of the hollow member can be readily drawn towards the passenger compartment through the opening section.

Furthermore, according to the present invention, the rim of the opening section is surrounded by the stepped section for reinforcement. Therefore, the inner panel has a large stiffness around the rim.

Furthermore, according to the present invention, the degree to which the stepped bead bulges from the inner panel is larger at the front end section and gradually decreases towards the rear section of the vehicle body. Therefore, impact load acting on the front section of the vehicle body can be transmitted to the hollow member through the stepped bead in an efficient manner.

MODES FOR CARRYING OUT THE INVENTION

Certain preferred embodiments of the present invention are described below with reference to the accompanying drawings.

First Embodiment

Figure 1:
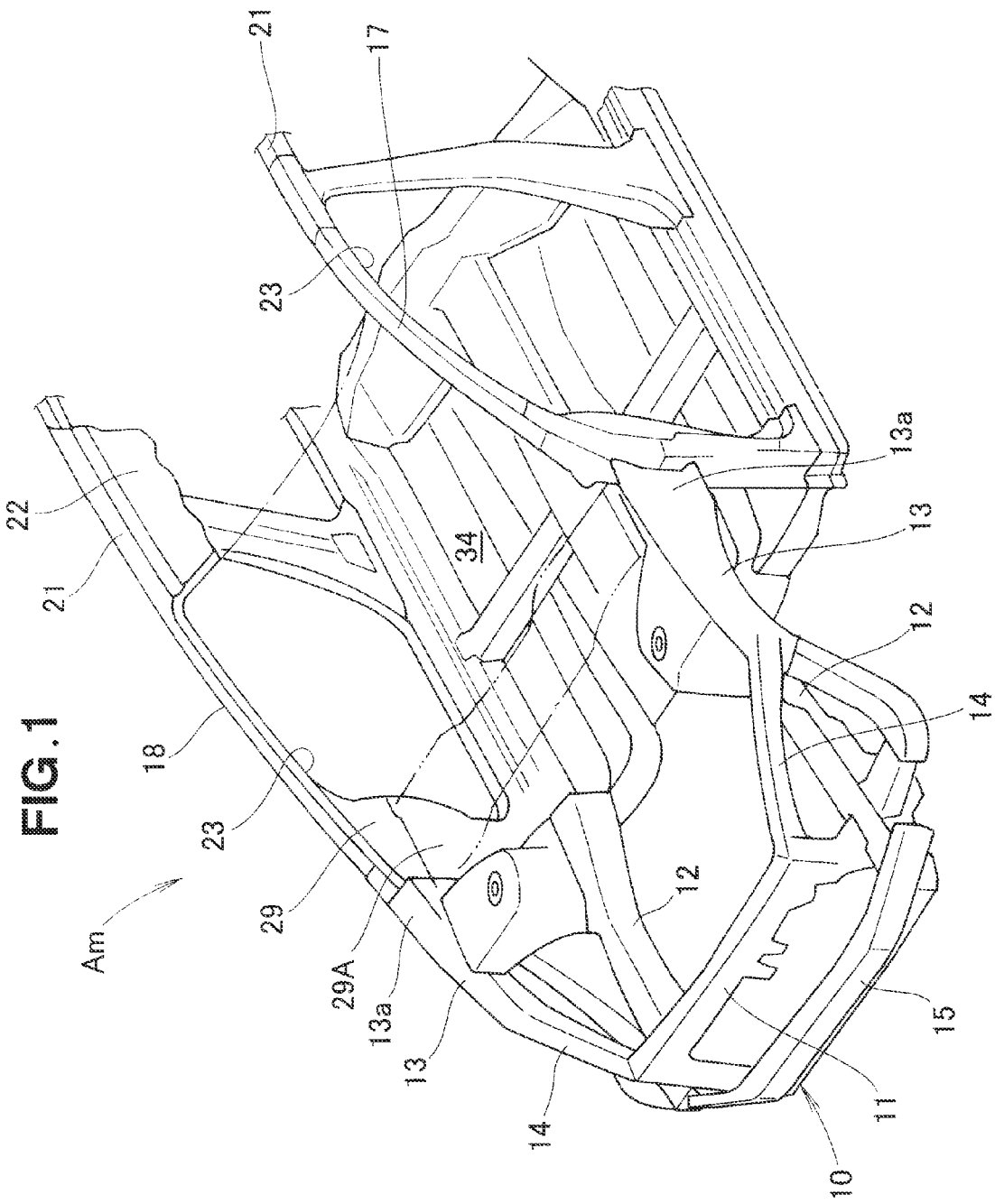
FIG. 1 is a perspective view showing a vehicle body having left and right front pillars according to a first embodiment of the present invention.

A front pillar for an automobile according to a first embodiment will first be described with reference to FIGS. 1 through 7. FIG. 1 shows a front section of a vehicle body 10 of an automobile Am. The front section of the vehicle body 10 is a monocoque body, mainly comprising a front bulkhead 11, left and right front side frames 12, 12, left and right upper frames 13, 13, left and right upper side frames 14, 14, a front bumper beam 15, left and right front pillars 17, 18, left and right roof side rails 21, 21, and a roof 22.

The front bulkhead 11 is located at a front end surface of the vehicle body 10, and is capable of supporting a radiator (not shown). Each of the left and right front side frames 12, 12 extends rearwards from left and right lower end sections of the front bulkhead 11, respectively. Each of the left and right upper frames 13, 13 extends rearwards and upwards from the left and right lower end sections of the front bulkhead 11, respectively. Each of the upper frames 13, 13 is located further outward in the vehicle width direction of, and above, the left and right front side frames 12, 12 respectively. Each of the left and right upper side frames 14, 14 extends rearwards from left and right end sections of the front bulkhead 11 respectively, and joins the left and right upper frames 13, 13 respectively. The front bumper beam 15 bridges between respective front ends of the left and right front side frames 12, 12.

Each of the left and right front pillars 17, 18 extends at an incline rearwards and upwards from a rear end of the left and right upper frames 13, 13 respectively, and forms a part of a door opening 23 that is opened or closed by a side door (not shown). A windshield (i.e., a windscreen), not shown in FIG. 1, is mounted between the left and right front pillars 17, 18. Each of the left and right roof side rails 21, 21 extends rearwards from a rear end of each of the left and right front pillars 17, 18 respectively. The roof 22 is supported by the left and right roof side rails 21, 21.

The left and right front pillars 17, 18 are members that are bilaterally symmetrical to each other. A description will be given hereafter for the right front pillar 18 only; a description for the left front pillar 17 will be omitted. The right front pillar 18 will hereafter be referred to simply as the front pillar 18.

Figure 2:
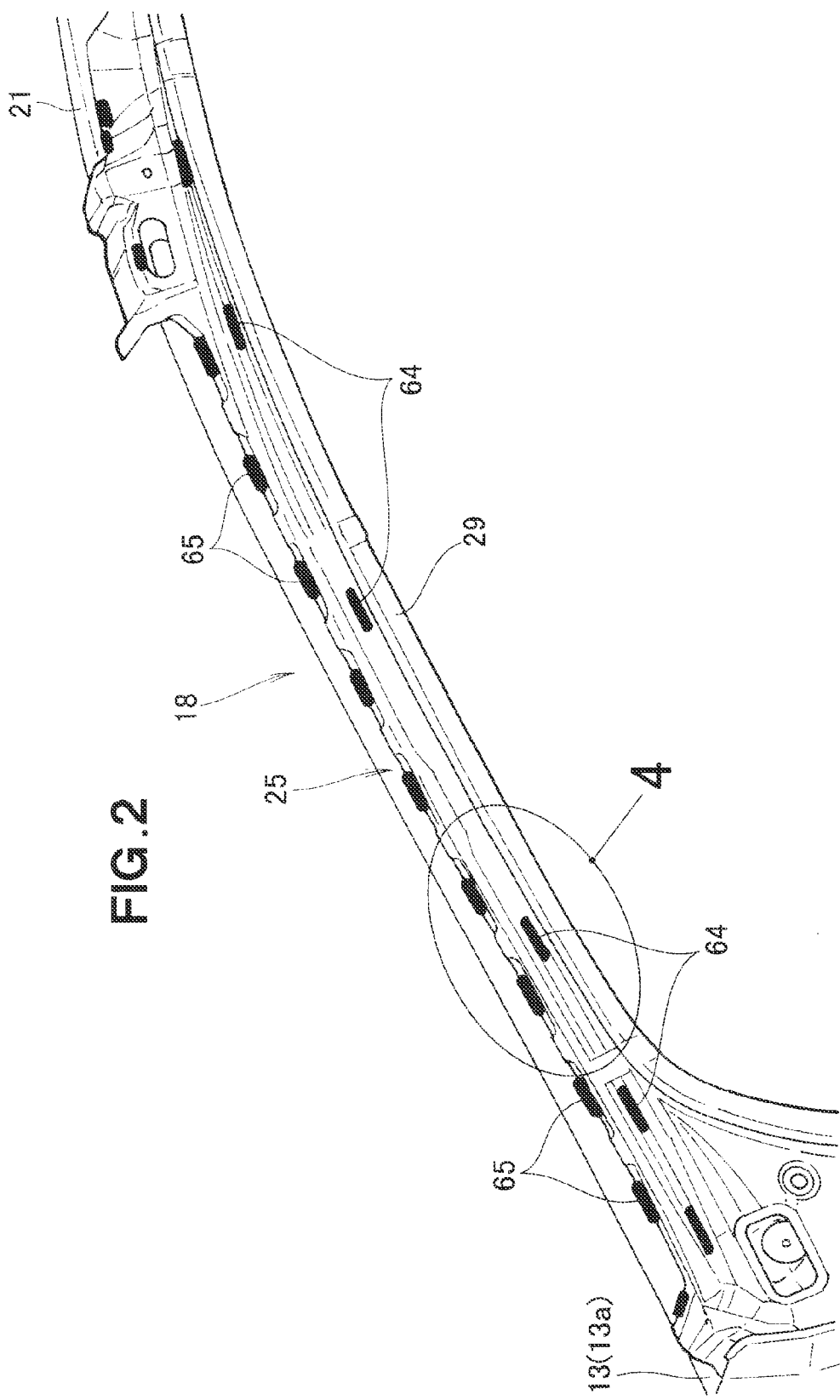
FIG. 2 is a view showing the right front pillar of FIG. 1, as seen from above on the passenger compartment side.
Figure 3:
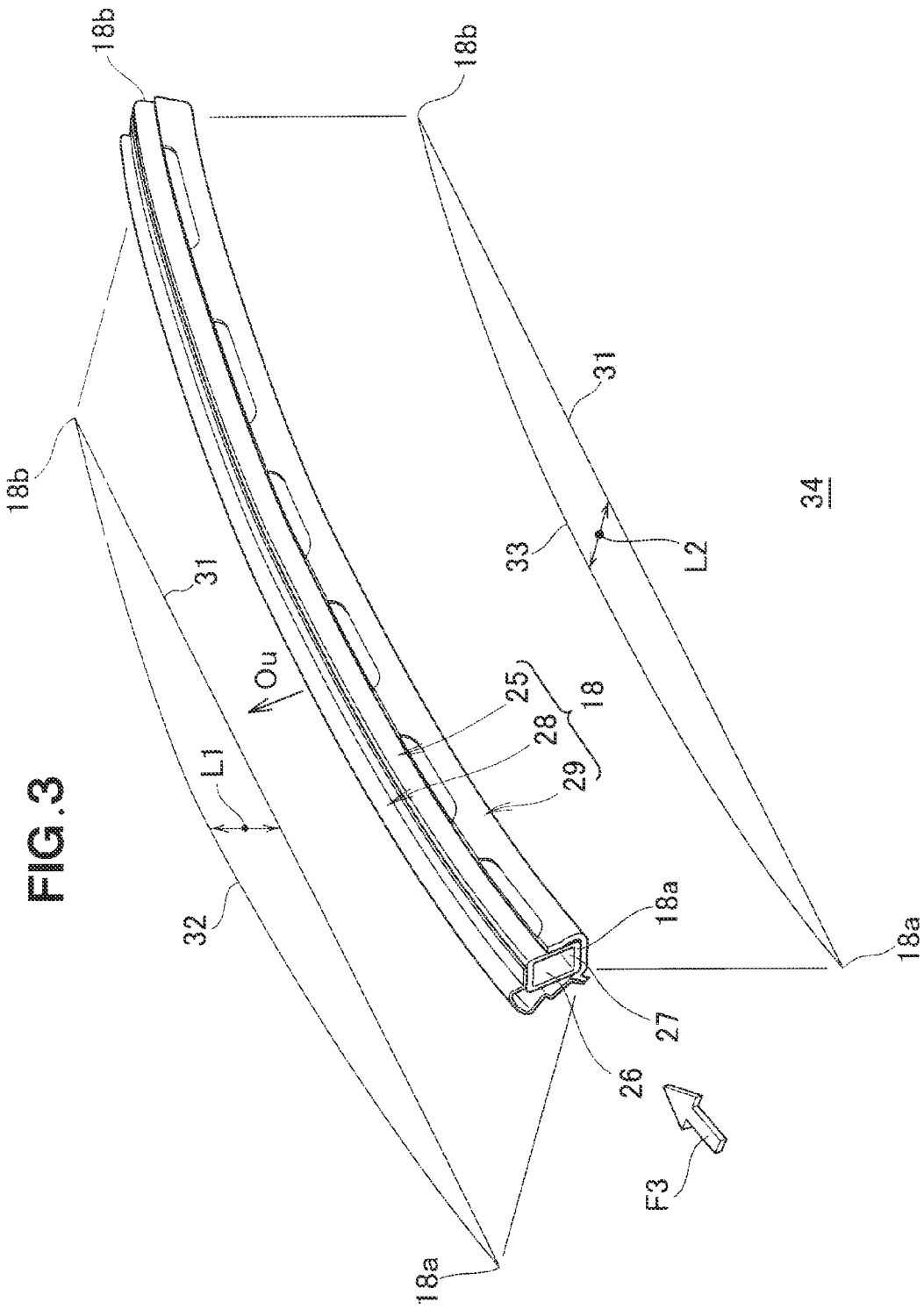
FIG. 3 is a view illustrating a curved state of the right front pillar of FIG. 2.

FIGS. 2 and 3 show the front pillar 18 as viewed from a side facing a passenger compartment 34 (see FIGS. 1 and 3). The front pillar 18 comprises a hollow member 25, an outer panel 28, and an inner panel 29. The hollow member 25 is a long material that functions as a core material of the front pillar 18, and a front end is joined to a rear end section 13a of the right upper arm 13 shown in FIG. 1. The hollow member 25 is made from, for example, a steel material, and is integrally formed by hydroforming so as to have a substantially rectangular closed cross-section. In other words, the hollow member 25 is made of a rectangular pipe. In the first embodiment, substantially rectangular refers to a rectangle, a square, or another quadrilateral.

As shown in FIG. 3, the front pillar 18 has a curved shape, the entirety of which projects to an outside of the vehicle body 10 (arrow Ou). Therefore, each of the hollow member 25, the outer panel 28, and the inner panel 29 has a curved shape, the entirety of which projects to the outside of the vehicle body 10. Specifically, the overall shape of the front pillar 18 is a curve that projects upward, and outward in the vehicle width direction, of the vehicle body 10.

A straight line 31 passing through the front end 18a and a rear end 18b of the front pillar 18 shall be referred to as a reference line 31. When the vehicle body 10 is viewed from the vehicle width direction, a profile line 32 of the front pillar 18 curving upwards projects upward of the vehicle body 10 from the reference line 31 by a distance L1. When the vehicle body 10 is viewed from above, a profile line 33 of the front pillar 18 curving outward in the vehicle width direction projects outward in the vehicle width direction from the reference line 31 by a distance L2.

Figure 4:
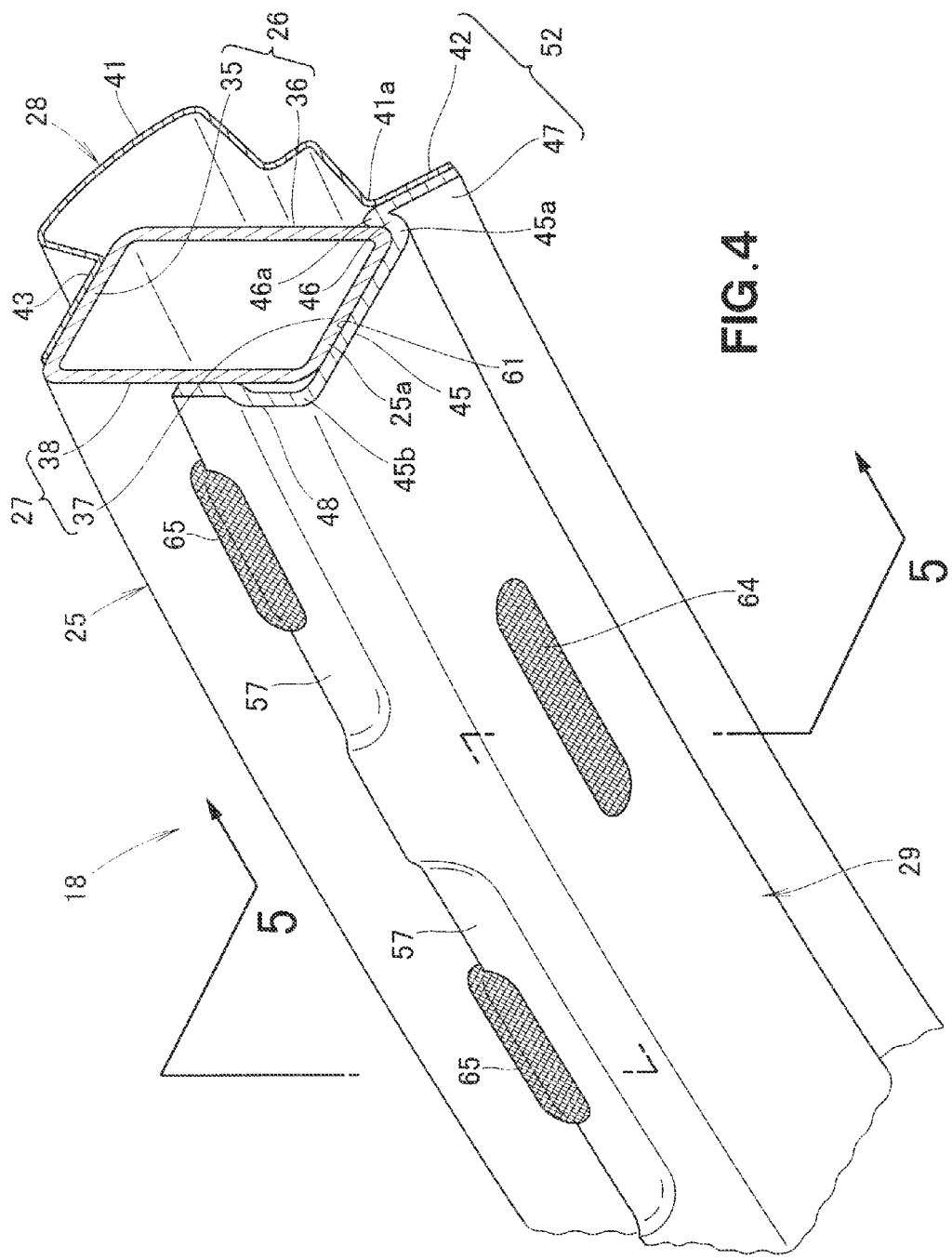
FIG. 4 is a view showing on an enlarged scale section 4 of FIG. 2.
Figure 5:
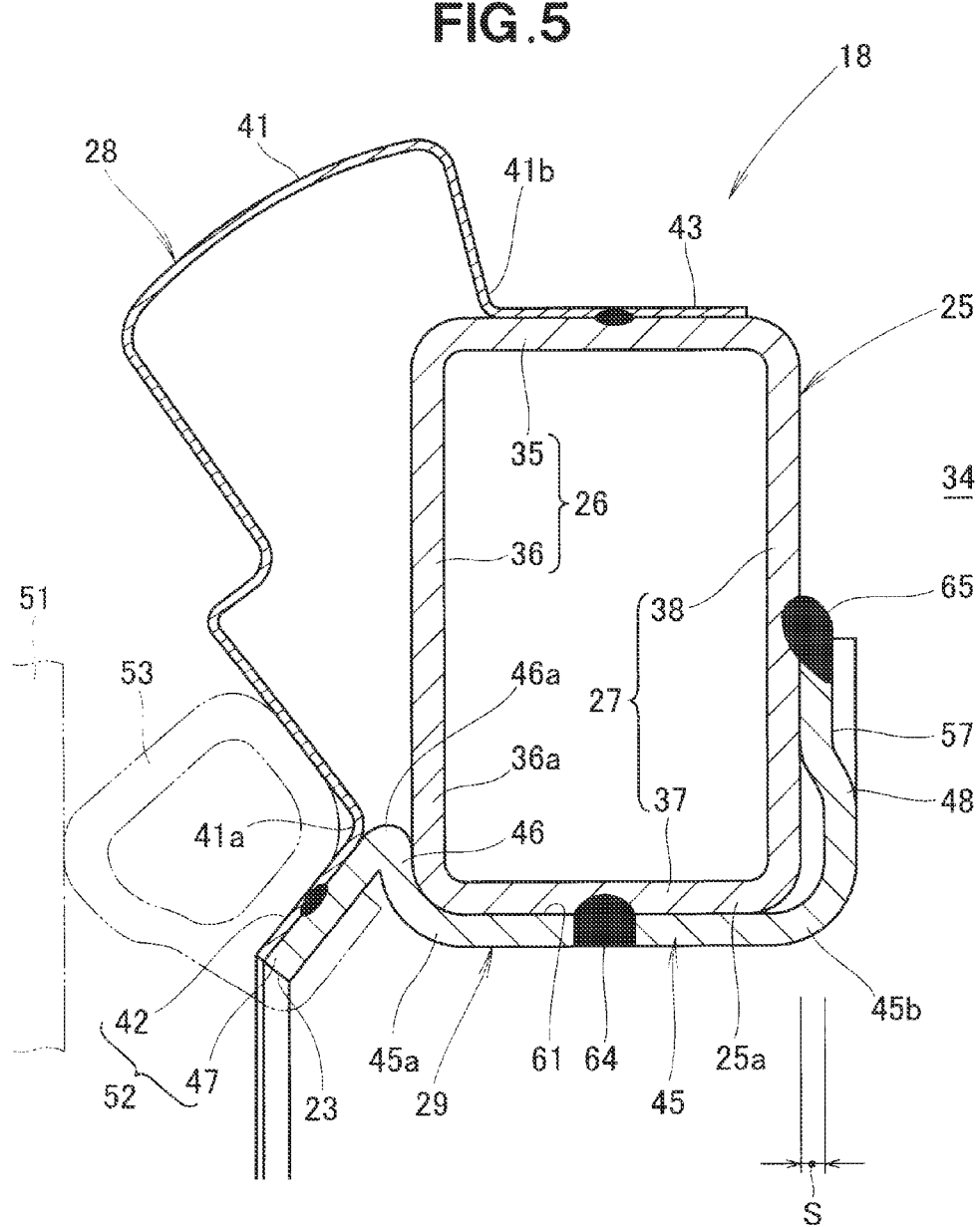
FIG. 5 is a cross-sectional view taken along line 5-5 of FIG. 4.

As shown in FIGS. 3 through 5, the hollow member 25 is formed by four sides, namely four wall sections 35 through 38, so as to have a rectangular cross section. The four wall sections 35 through 38 are an outer upper wall section 35 located at a top, an outer side wall section 36 located on an outside in the vehicle width direction, an inner lower wall section 37 located at a bottom, and an inner side wall section 38 located on an inside in the vehicle width direction. The outer upper wall section 35 and the outer side wall section 36 form a vehicle exterior-side wall section 26 (i.e., a wall section 26 on a vehicle exterior side) that is substantially L-shaped in cross section. The vehicle exterior-side wall section 26 is positioned on the hollow member 25 towards an exterior of the vehicle body 10. The inner lower wall section 37 and the inner side wall section 38 form a passenger compartment-side wall section 27 (i.e., a wall section 27 on a passenger compartment 34 side) that is substantially L-shaped in cross section. The passenger compartment-side wall section 27 is positioned on the hollow member 25 towards an interior of the vehicle body 10 (i.e., towards the passenger compartment 34).

As described above, the hollow member 25 has a curved shape, the entirety of which projects to the outside of the vehicle body 10. As a result, the vehicle exterior-side wall section 26 has a curved shape, the entirety of which projects to the outside of the vehicle body 10 (i.e., a convex curved shape). The passenger compartment-side wall section 27, positioned towards the passenger compartment 34, has a curved shape, the entirety of which is recessed towards the outside of the vehicle body 10 (i.e., a concave curved shape).

Each of the outer panel 28 and the inner panel 29 is a long material extending along the hollow member 25, and is provided to the hollow member 25. More specifically, the outer panel 28 is provided to the vehicle exterior-side wall section 26, and the inner panel 29 is provided to the passenger compartment-side wall section 27.

The outer panel 28 is, for example, a folded molded article made of a steel plate, and comprises an outer panel body 41, a first outer flange 42, and a second outer flange 43. The outer panel body 41 has a substantially U-shaped cross section, opens towards the vehicle exterior-side wall section 26, and has the first and second outer flanges 42, 43 provided to both ends 41a, 41b of the opening. One of the ends 41a is positioned near a corner between the outer side wall section 36 and the inner lower wall section 37. The other end 41b is positioned near a corner between the outer upper wall section 35 and the outer side wall section 36. The first outer flange 42 (i.e., the first flange 42) extends from the end 41a of the outer panel body 41 towards the outside of the vehicle body 10. A distal end of the first outer flange 42 is positioned away from the corner between the outer side wall section 36 and the inner lower wall section 37. The second outer flange 43 (i.e., the second flange 43) extends from the other end 41b of the outer panel body 41, along the outer upper wall section 35, towards the passenger compartment 34.

The inner panel 29 is, for example, a folded molded article made of a steel plate, formed so as to enclose a lower section of the hollow member 25. The inner panel 29 comprises an inner panel body 45, a restricting section 46, a first inner flange 47, and a second inner flange 48. As shown in FIG. 1, a lower front section of the inner panel 29 is joined to a lower inner panel 29A projecting upright from a lower section of the vehicle body 10. The lower inner panel 29A functions to link the lower section of the vehicle body 10 to the lower front section of the front pillar 18 as a part of a "front pillar undersection."

As shown in FIGS. 3 through 5, the inner panel body 45 comprises a flat plate that is overlapped with and joined to the passenger compartment-side wall section 27, and a predetermined welding position 64 (i.e., a welding section 64) is welded to the inner lower wall section 37. The restricting section 46 extends upwards from an end 45a of the inner panel body 45 towards the outside in the vehicle width direction, following the corner between the outer side wall section 36 and the inner lower wall section 37. A top end 46a of the upward extension is provided with the first inner flange 47. The restricting section 46 overlaps with a lower section 36a of the outer side wall section 36 up to a predetermined height.

The first inner flange 47 (i.e., a first flange 47) extends from the top end 46a of the restricting section 46 so as to lie along a lower surface of the first outer flange 42 of the outer panel 28. The first inner flange 47 is caused to overlap with the first outer flange 42 of the outer panel 28 from below, and is joined by direct spot welding. The flanges 42, 47 thus integrated by joining are capable of functioning as a member for reinforcing the hollow member 25. As a result, the stiffness of the front pillar 18 is increased.

The integrated flanges 42, 47 form a rim section 52 of the door opening 23. The rim section 52 functions as a seal attachment section for attaching a sealing material 53. The rim section 52 shall hereafter be referred to as a seal attachment section 52. The sealing material 53 is a material for sealing between the door opening 23 and a side door 51 when the door opening 23 is closed by the side door 51. Since the flanges 42, 47 are integrated, the stiffness of the seal attachment section 52 is increased. The sealing material 53 can be adequately supported by the seal attachment section 52 having a high stiffness.

The second outer flange 43 of the outer panel 28 is caused to overlap with the outer upper wall section 35 of the hollow member 25, and is joined by indirect spot welding. The second inner flange 48 of the inner panel 29 is caused to overlap with the inner side wall section 38 of the hollow member 25, and is joined by MIG welding (metal inert gas welding). The second outer flange 43 and the second inner flange 48 are provided separately to the hollow member 25. Therefore, there is no need to join the second outer flange 43 and the second inner flange 48 so as to overlap each other. The size of each of the outer panel 28 and the inner panel 29 can be reduced by an amount corresponding to the extent to which the second outer flange 43 and the second inner flange 48 do not overlap. Therefore, the weight of the front pillar 18 can be reduced.

The second inner flange 48 (i.e., a second flange 48) extends upwards from an end 45b of the inner panel body 45 towards the inside in the vehicle width direction so as to lie along the inner side wall section 38. The second inner flange 48 overlaps the inner side wall section 38 up to half the height of the inner side wall section 38. The second inner flange 48 is positioned relative to the inner side wall section 38 so that a predetermined space S is provided therebetween.

The second inner flange 48 has a plurality of joint sections 57 provided to an upper end portion 48a. The joint sections 57 are sections at which the second inner flange 48 projects towards the inner side wall section 38 so as to contact and join the inner side wall section 38. The joint sections 57 are arranged at a predetermined pitch along the longitudinal direction of the hollow member 25, and an upper end 65 (i.e., a welding section 65) of each of the joint sections 57 is joined by MIG welding to the inner side wall section 38.

The inner panel body 45, the restricting section 46, and the second inner flange 48 form a restricting concave section 61. The restricting concave section 61 is a concave section in which a part 25a; i.e., a lower section 25a, of the hollow member 25 can be fitted and accommodated. The lower section 25a of the hollow member 25 is sandwiched between the restricting section 46 and the joint sections 57. The hollow member 25 is restricted from undergoing relative displacement in the vehicle width direction relative to the inner panel 29. The hollow member 25 is therefore reinforced by the inner panel 29. As a result, the stiffness of the hollow member 25 can be increased. Therefore, an impact load acting on a front end of the hollow member 25 can be transmitted to a rear section of the vehicle body 10 in an efficient manner.

Figure 6:
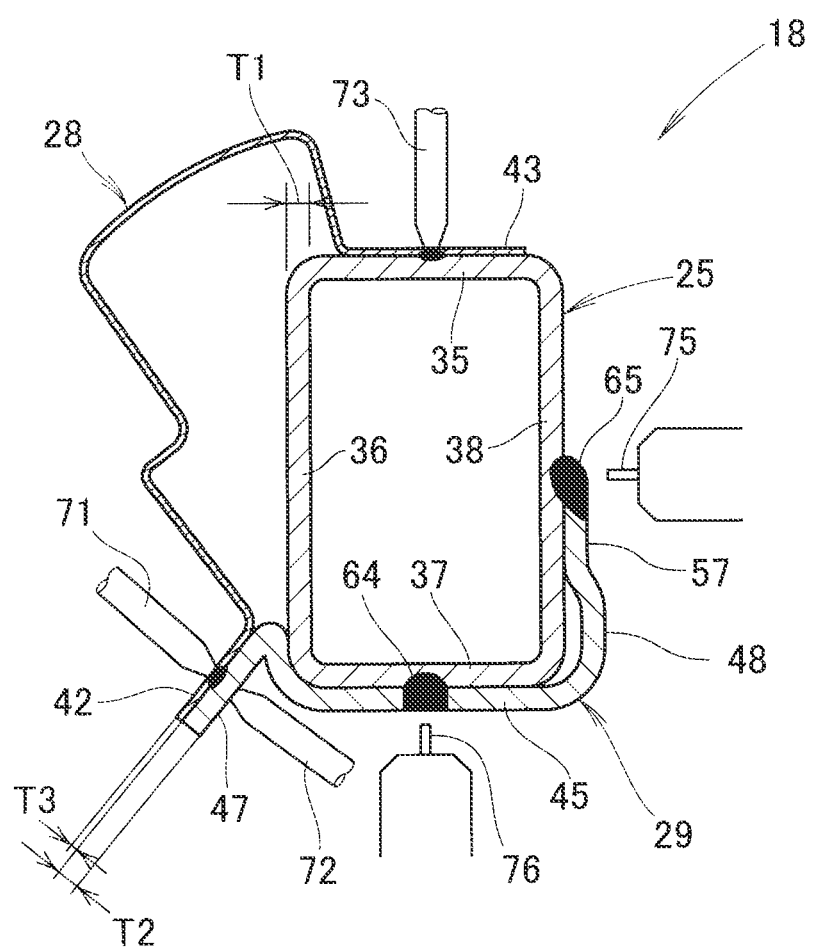
FIG. 6 is a view illustrating an example mode of welding of the front pillar of FIG. 5.

Next, an example of welding the front pillar 18 will be described with reference to FIG. 6. The first outer flange 42 and the first inner flange 47 are joined by spot welding as follows. Each of the overlapped flanges 42, 47 is shaped so as to extend away from the hollow member 25, and is outwardly exposed. As a result, the flanges 42, 47 can be sandwiched between a pair of electrodes 71, 72, and joining by direct spot welding can therefore be performed. The flanges 42, 47 in a state of overlapping each other are sandwiched by a pair of electrodes 71, 72. Next, an electrical current is supplied between the electrodes 71, 72, thereby joining the flanges 42, 47 by direct spot welding.

The outer upper wall section 35 and the second outer flange 43 are joined by spot welding as shall now be described. An electrode 73 is pressed against the second outer flange 43 in a state in which the second outer flange 43 overlaps the outer upper wall section 35. Next, an electrical current is supplied between the electrode 73 and the outer upper wall section 35, thereby joining the electrode 73 to the outer upper wall section 35 by indirect spot welding. The joining step does not require the second outer flange 43 and the outer upper wall section 35 overlapping each other to be sandwiched between a pair of electrodes. Therefore, there is no need to insert an electrode into the hollow member 25 and press the electrode against an inner surface of the hollow member 25.

The inner side wall section 38 and the second inner flange 48 are joined by MIG welding as shall now be described. In a state in which the second inner flange 48 overlaps the inner side wall section 38, a welding wire 75 is positioned in proximity with the second inner flange 48, the welding wire 75 is used as an electrode, and the second inner flange 48 is joined to the inner side wall section 38 by MIG welding. By positioning the welding wire 75, which functions as the electrode, in proximity with the second inner flange 48 as described above, it is possible to join the second inner flange 48 to the inner side wall section 38. There is no need for a step for inserting an electrode into the hollow member 25, or for a step for pressing the inserted electrode against an inner surface of the hollow member 25. By employing welding means suitable for the configuration of each joint section as described above, a step for joining by welding can be performed in an efficient manner; therefore, the capacity for mass production of the front pillar 18 can be improved.

A wall thickness dimension T1 of the hollow member 25 is relatively large, and a plate thickness dimension T2 of the inner flange 29 is larger than a plate thickness dimension T3 of the outer flange 28. Therefore, the second inner flange 48 is joined to the hollow member 25 by MIG welding. Therefore, the second inner flange 48 can be joined more firmly to the hollow member 25, and the stiffness of the front pillar 18 can be further increased.

The inner lower wall section 37 and a center portion 45 of the inner panel 29 (i.e., the inner panel body 45) are joined by MIG welding as shall now be described. In a state in which the inner panel body 45 overlaps the inner lower wall section 37, a welding wire 76 is placed in proximity with the inner panel 29 with a laser being jointly used. Next, the welding wire 76 is moved along the welding section 64, the welding position 64 is caused to melt onto the inner lower wall section 37, and the inner panel body 45 is joined to the inner lower wall section 37. In other words, the welding position 64 is caused to melt onto the inner lower wall section 37 when such MIG welding is performed, for which reason it is known as "penetrating MIG welding." By using MIG welding to join the inner panel body 45 to the inner lower wall section 37, the stiffness of the front pillar 18 can be further increased. It thereby becomes possible to support an impact load acting on the front pillar 18, even when a relative large load is acting, such as in a case of an offset collision.

Figure 7:
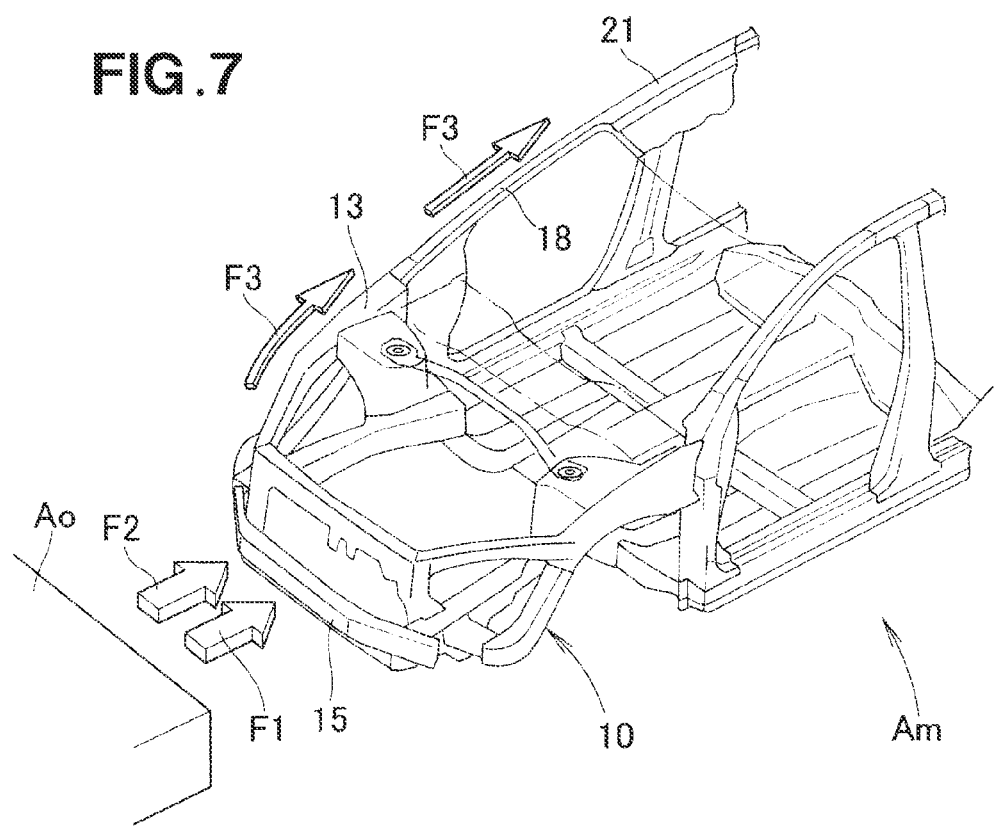
FIG. 7 is a schematic view illustrating an impact load acting on the right pillar of FIG. 1.

Next, an example of an impact load acting on the front pillar 18 will be described with reference to FIG. 7. When the automobile Am collides head-on with an oncoming vehicle Ao (or an obstacle Ao), an impact load F1 acts on a center of the front bumper beam 15. Also, when the automobile Am experiences an offset collision with an oncoming vehicle Ao, an impact load F2 acts on the front bumper beam 15 at a position offset from the center. A part of the impact load F1, F2 is transmitted as an impact load F3 to the front pillar 18 from the front bumper beam 15 through the right upper arm 13.

As shown in FIG. 3, the hollow member 25 has a curved shape, the entirety of which projects to the outside of the vehicle body 10. When the impact load F3 acts on the front end of the hollow member 25 as indicated by an arrow, tensile stress is generated in the vehicle exterior-side wall section 26 of the hollow member 25, and compressive stress is generated in the passenger compartment-side wall section 27 of the hollow member 25. In other words, the impact load F3 acts so as to bend the hollow member 25 towards the exterior of the vehicle body.

According to the first embodiment, the inner panel 29 is overlapped with and joined to the passenger compartment-side wall section 27 of the hollow member 25 as shown in FIG. 5, thereby reinforcing the hollow member 25. As a result, the stiffness of the hollow member 25 is increased. Therefore, the hollow member 25 can transmit the impact load F3 to the rear section of the vehicle body 10 in an efficient manner. Also, there is no need to increase the overall thickness or the wall thickness of the hollow member 25 in order to increase the stiffness of the hollow member 25. Therefore, an increase in the weight of the front pillar 18 can be minimized, and the size of the front pillar 180 can be reduced. Reducing the size of the front pillar 18 expands the visual field from the passenger compartment.

Second Embodiment

Next, a vehicle body 10A of an automobile Am according to a second embodiment will be described with reference to FIGS. 8 through 17. The vehicle body 10A according to the second embodiment has a configuration that is essentially the same as that of the vehicle body 10 according to the first embodiment. A description of the vehicle body 10A will now be given.

FIGS. 8 through 11 show a right front pillar 18A as viewed from a side facing a passenger compartment 34 (see FIG. 1). The front pillar 18A according to the second embodiment comprises a hollow member 131, an outer panel 132, and an inner panel 133. The front pillar 18A has a configuration that is essentially the same as that of the front pillar 18 according to the first embodiment. The hollow member 131 has a configuration that is essentially the same as that of the hollow member 25 according to the first embodiment. The outer panel 132 has a configuration that is essentially the same as that of the outer panel 28 according to the first embodiment. The inner panel 133 has a configuration that is essentially the same as that of the inner panel 29 according to the first embodiment.

The front pillar 18A has a curved shape, the entirety of which projects to the outside of the vehicle body 10A. Therefore, each of the hollow member 131, the outer panel 132, and the inner panel 133 has a curved shape, the entirety of which projects to the outside of the vehicle body 10A. Specifically, the overall shape of the front pillar 18A is a curve that projects upward, and outward in the vehicle width direction, of the vehicle body 10A.

The hollow member 131 is a long material that functions as a core material of the front pillar 18A, and a front end section 131c is joined to a rear end section 13a of the right upper arm 13. The hollow member 131 is made from, for example, a steel material, and is integrally formed by hydroforming so as to have a substantially rectangular closed cross-section. In other words, the hollow member 131 is made of a rectangular pipe. In the second embodiment, substantially rectangular refers to a rectangle, a square, or another quadrilateral.

The hollow member 131 is formed in a substantially rectangular shape by a wall section 131a towards a vehicle exterior side (i.e., a vehicle exterior-side wall section 131a) and a wall section 131b towards the passenger compartment 34 (i.e., a passenger compartment-side wall section 131b). The outer panel 132 is positioned so as to surround the vehicle exterior-side wall section 131a, and is joined to the vehicle exterior-side wall section 131a. The inner panel 133 is positioned so as to surround the passenger compartment-side wall section 131b, and is joined to the passenger compartment-side wall section 131b.

Figure 12:
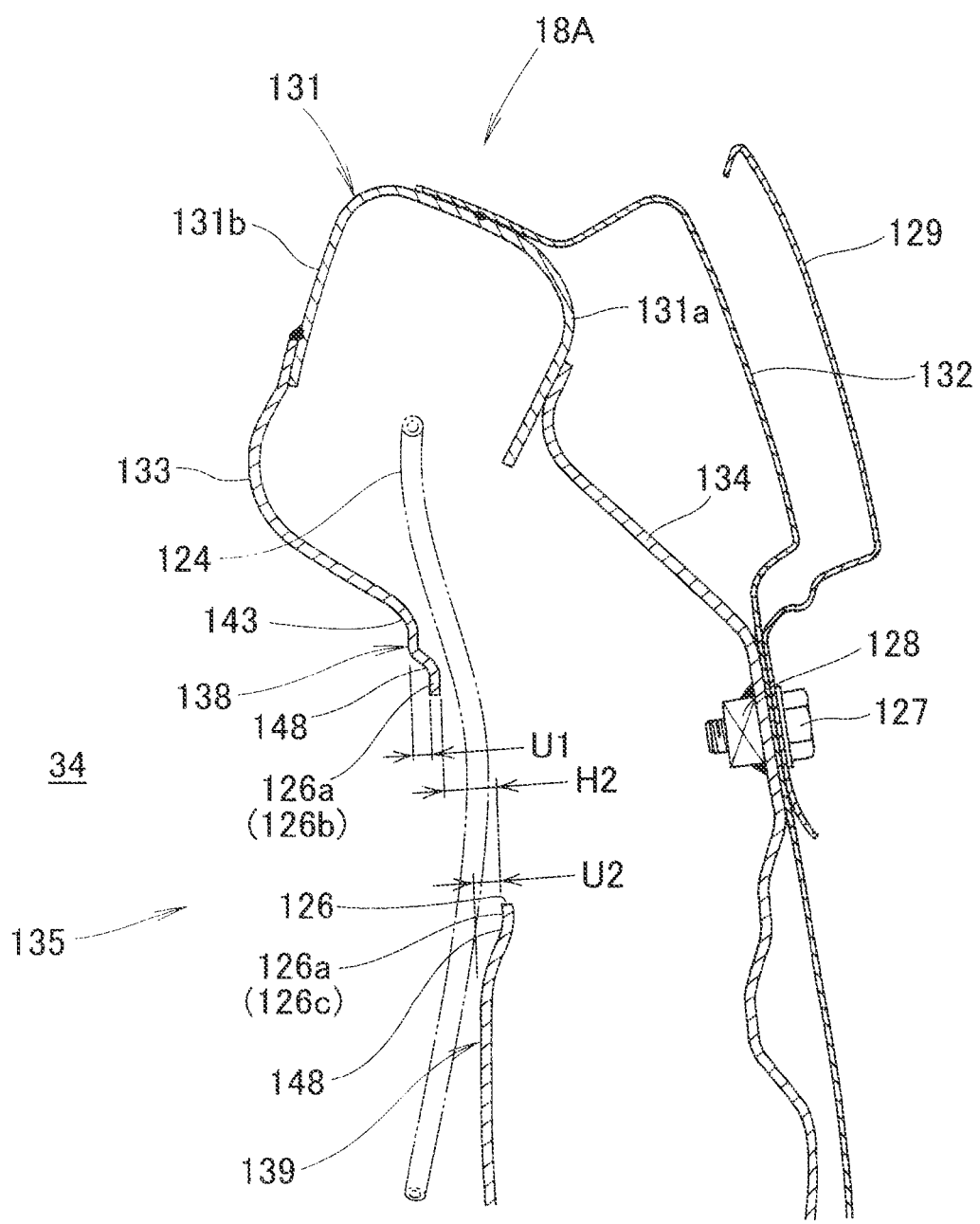
FIG. 12 is a cross-sectional view taken along line 12-12 of FIG. 9.

As shown in FIG. 12, a front fender 129 is attached to an outer surface of the outer panel 132 by a bolt 127 and a nut 128. The front fender 129 is a vehicle body exterior member. An inner surface of the outer panel 132 is reinforced by a stiffener 134.

Figure 8:
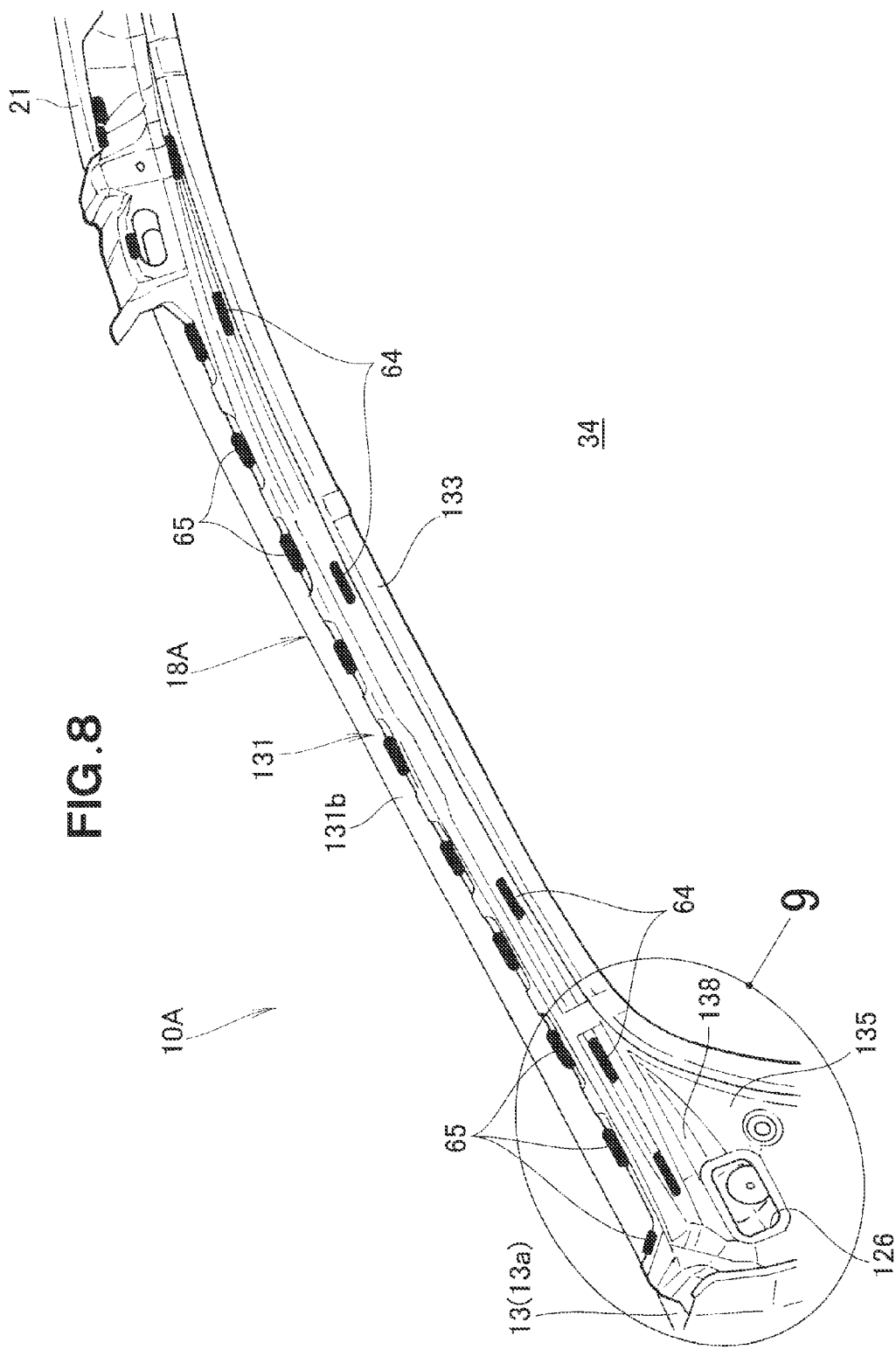
FIG. 8 is a view showing left and right pillars according to a second embodiment of the present embodiment, as seen from the passenger compartment side.
Figure 9:
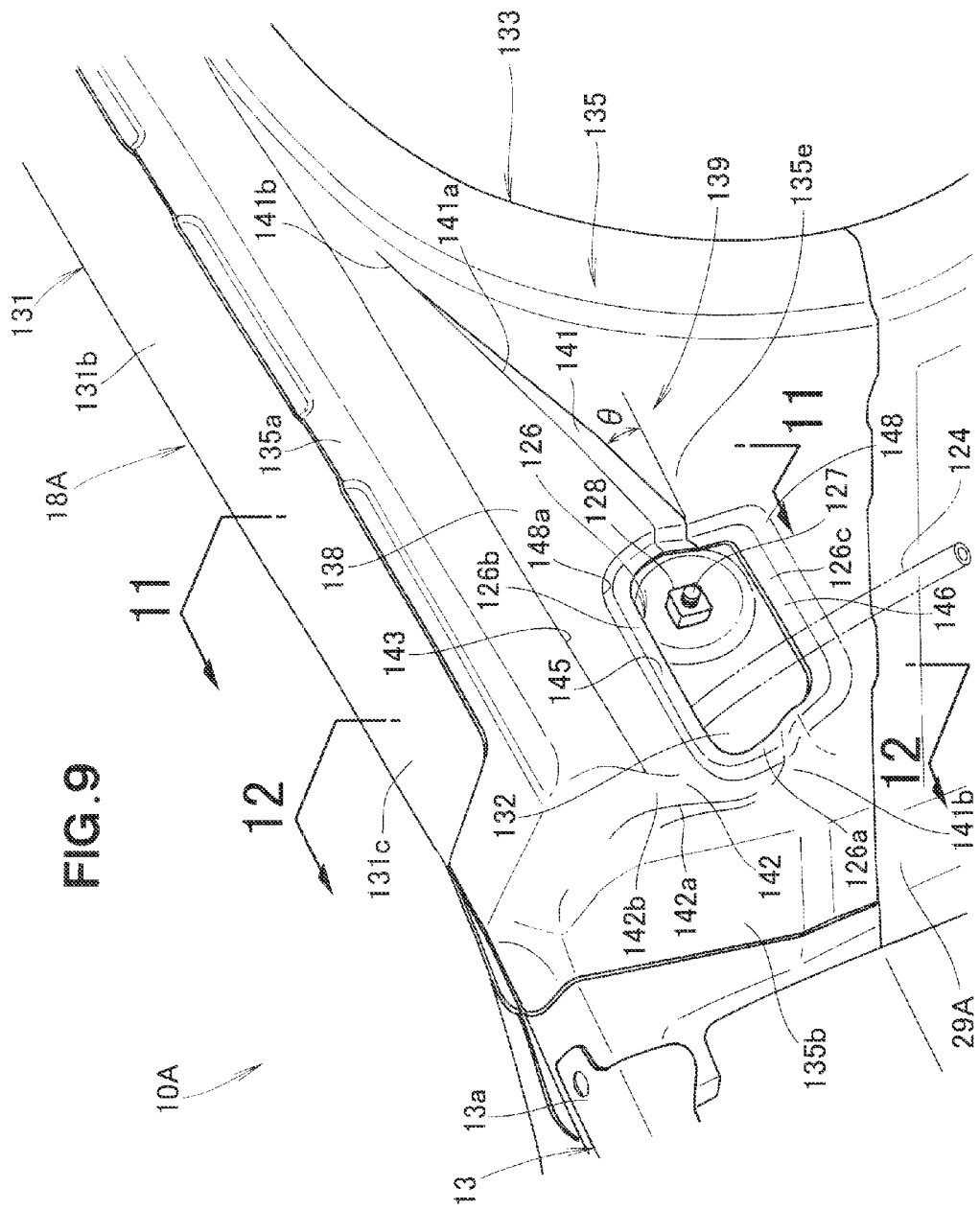
FIG. 9 is a view showing on an enlarged scale section 9 of FIG. 8.
Figure 10:
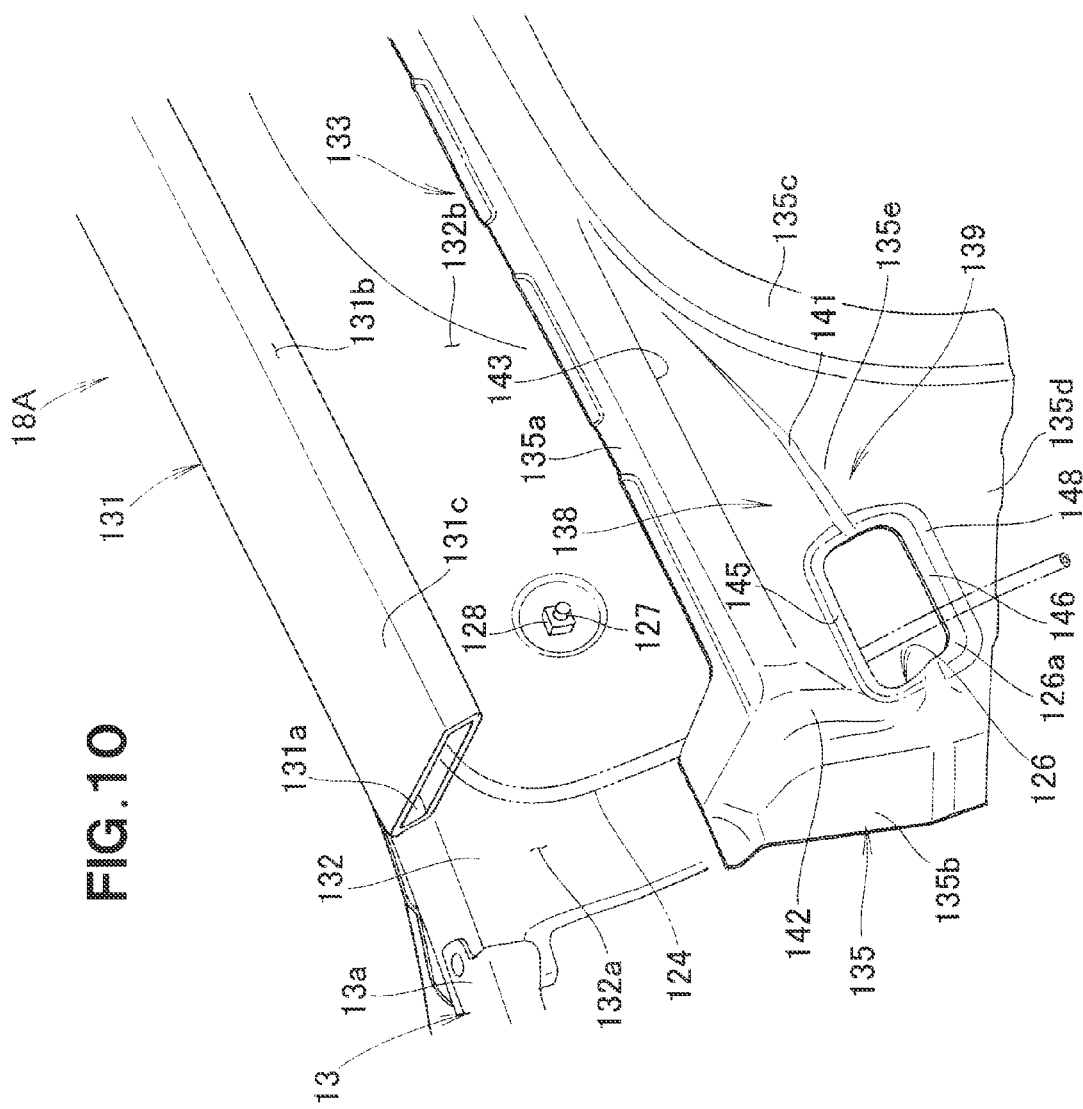
FIG. 10 is an exploded view showing a region around a lower section of the right front pillar of FIG. 9.

As shown in FIGS. 8 through 10, a front section 135 of the inner panel 133 extends downwards. The front section 135 extending downwards shall be referred to as a lower panel section 135. An upper end portion 135a of the lower panel section 135 is joined to a front end section 131c of the hollow member 131. A front end portion 135b of the lower panel section 135 is joined to a front end portion 132a of the outer panel 132. A rear end portion 135c of the lower panel section 135 is joined to a rear end portion 132b of the outer panel 132. A lower end portion 135d of the lower panel section 135 is joined to a lower inner panel 29A (see FIG. 9).

The lower panel section 135 also has an opening section 126 and a stepped bead 138, provided to a substantially center portion 135e. Each of the opening section 126 and the stepped bead 138 is positioned downward of the hollow member 131. The stepped bead 138 is a portion that bulges from the inner panel 133 towards the passenger compartment 34. Specifically, the stepped bead 138 has a substantially triangular shape formed by three fold sections, namely a lower fold section 141, a front fold section 142, and an upper fold section 143, as shown in FIGS. 9 through 12. Providing the stepped bead 138 to the lower panel section 135 makes it possible to increase the stiffness of the lower panel section 135.

The lower fold section 141 extends from the lower panel section 135 of the lower panel section 135 towards the rear of the vehicle body at a positive incline of angle θ (see FIG. 9) so as to gradually approach the hollow member 131. Forming the lower fold section 141 on the lower panel section 135 forms a substantially linear ridge line 141a on the lower panel section 135.

The front fold section 142 extends downwards on the lower panel section 135 from a vicinity of the upper end portion 135a down to a front end portion 141b of the lower fold section 141. Forming the front fold section 142 on the lower panel section 135 forms a substantially linear ridge line 142a on the lower panel section 135.

The upper fold section 143 is located upward of the lower fold section 141. The upper fold section 143 extends, on the lower panel section 135, from an upper end portion 142b of the front fold section 142 to a vicinity of a rear end section 141b of the lower fold section 141, along the hollow member 131. The upper fold section 143 is a fold formed by a vicinity of the upper end portion 135a of the lower panel section 135 bulging along the hollow member 131 towards the passenger compartment 34, as shown in FIG. 11.

The opening section 126 is formed on the lower panel section 135 in a vicinity of the front end portion 135b and downward of the front end section 131c, and penetrates the lower panel section 135 in the vehicle width direction. The opening section 126 is positioned so as to as to span the lower fold section 141 of the stepped bead 138. When the inner panel 133 is viewed from a side facing the passenger compartment 34, the opening section 126 is substantially rectangular in shape. An upper half section 145 of the opening section 126 is positioned on the stepped bead 138. A lower half section 146 of the opening section 126 is positioned on a portion 139 downward of the stepped bead 138 (i.e., a below-bead portion 139).

As shown in FIGS. 9 through 12, a rim 126a of the opening section 126 is surrounded by a stepped section 148 for reinforcement. The stepped section 148 bulges from the lower panel section 135 outwards in the vehicle width direction. In other words, the stepped section 148 is indented relative to the stepped bead 138 by a depth dimension U1, and indented relative to the below-bead portion 139 by a depth dimension U2. Providing the stepped section 148 in the vicinity of the rim 126a of the opening section 126 forms a substantially rectangular ridge line 148a on the lower panel section 135. By providing the stepped section 148 to the rim 126a of the opening section 126, the stiffness of the lower panel section 135 around the rim 126a can thus be increased. As a result, the stiffness of the front pillar 18A can be increased.

Figure 11:
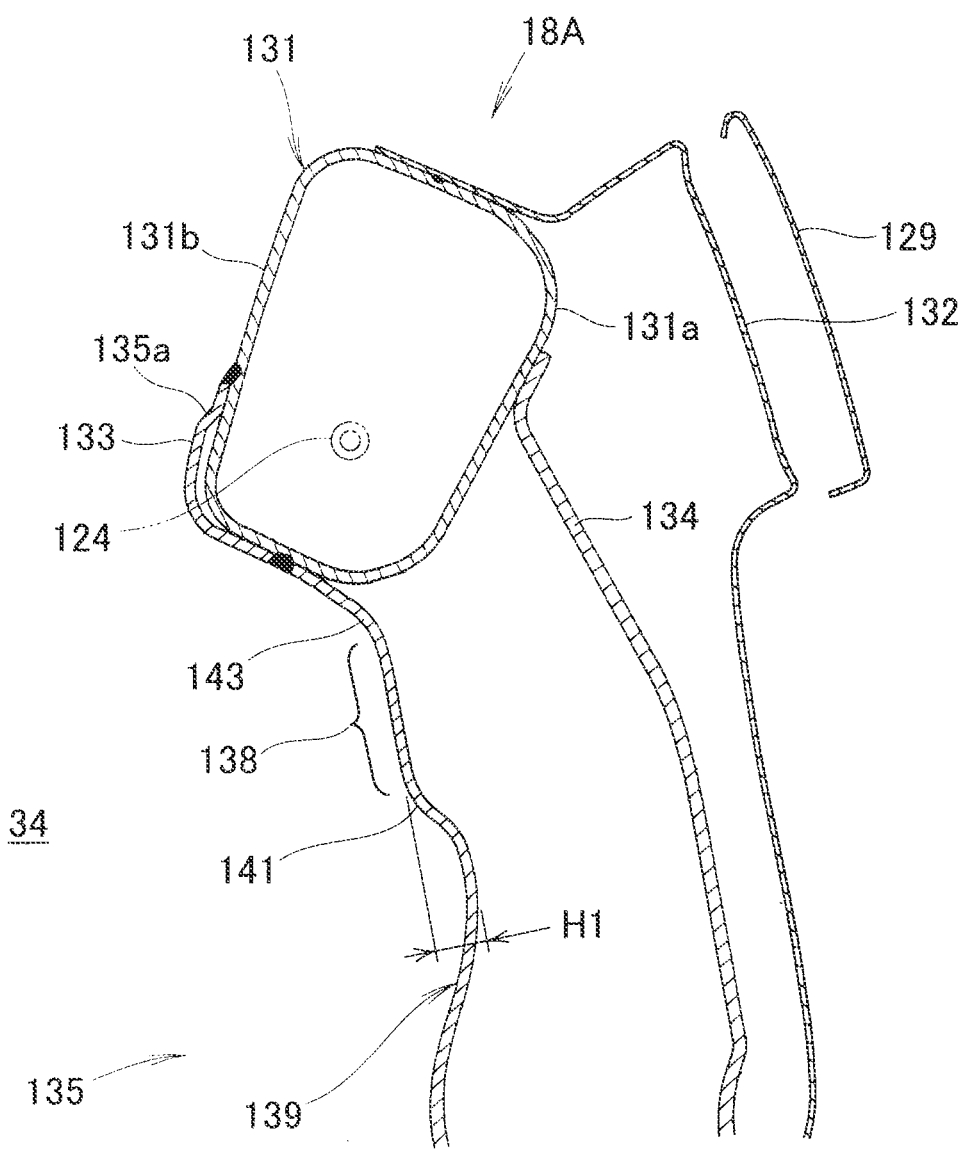
FIG. 11 is a cross-sectional view taken along line 11-11 of FIG. 9.

As shown in FIGS. 9 and 11, providing the lower fold section 141 to the lower panel section 135 causes the stepped bead 138 to bulge from the below-bead portion 139 towards the passenger compartment 34 by a dimension H1. Therefore, the stiffness of the lower panel section 135 can be increased. As a result, the stiffness of the front pillar 18A can be increased.

According to the second embodiment, the roof 22 shown in FIG. 1 is provided with a sunroof (not shown). Although not shown, a drain groove is provided to a support frame for supporting the sunroof on the roof 22. Rainwater falling on the sunroof flows through the drain groove into a drain hose 124. The drain hose 124 discharges the rainwater to a predetermined location outside the vehicle body 10A. The drain hose 124 is a type of flexible linear member. The drain hose 124 is passed through an interior of the hollow member 131 and pulled out through the opening section 126 formed on the inner panel 133 (see FIG. 9) towards the passenger compartment 34. In other words, as shown in FIGS. 9 and 12, the opening section 126 is an opening for drawing the drain hose 124 that has been drawn out from the front end section 131c of the hollow member 131.

As described above, the opening section 126 is positioned so as to span the lower fold section 141. Furthermore, as shown in FIGS. 9 and 12, the stepped section 148 is provided in the vicinity of the rim 126a of the opening section 126. The rim 126a of the opening section 126 is configured so that an upper portion 126b bulges towards the passenger compartment 34 by a dimension H2 (i.e., an opening gradation H2) from a lower portion 126c. Therefore, the drain hose 124 pulled out of the front end section 131c of the hollow member 131 can be readily pulled out through the opening section 126 by using the opening gradation H2.

Figure 13:
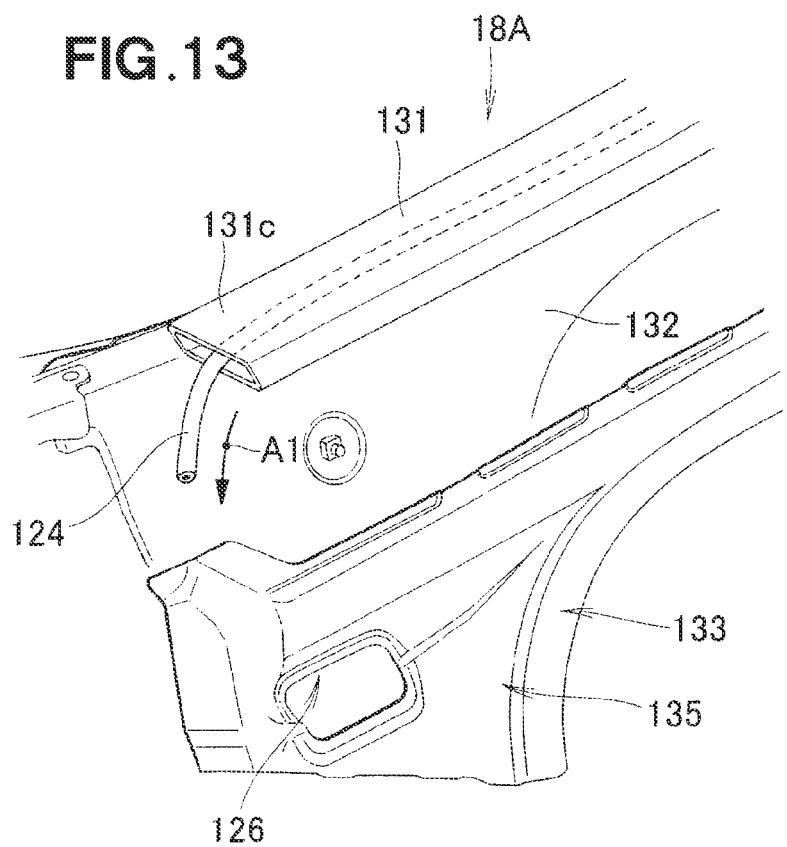
FIG. 13 is a schematic view showing a process of pulling a drain hose out of a hollow member of FIG. 10.
Figure 14:
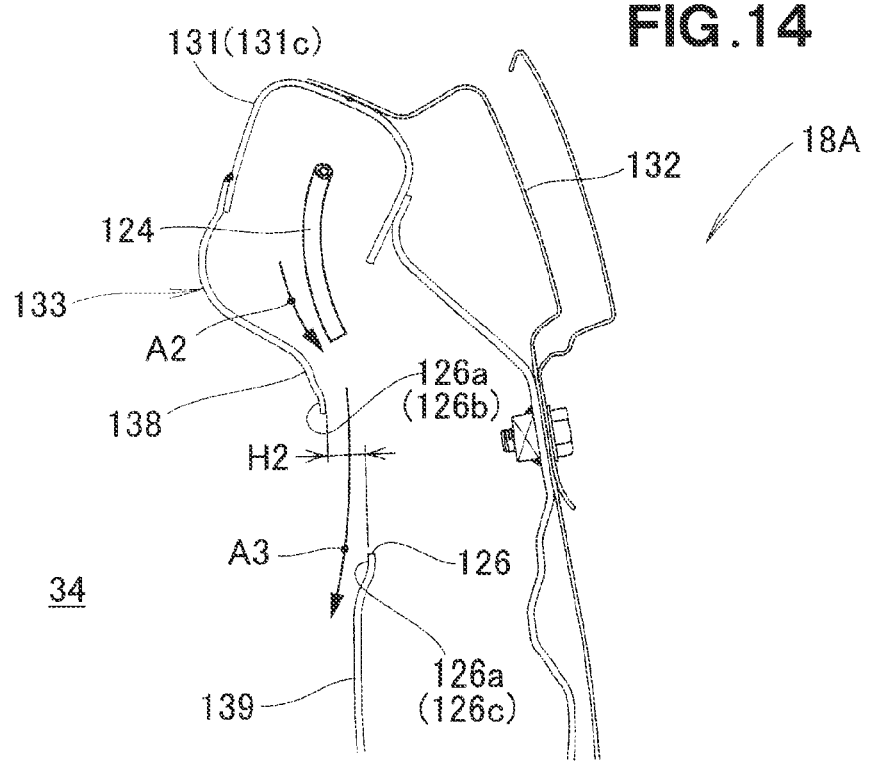
FIG. 14 is a schematic view showing a process of guiding the drain hose of FIG. 13 towards an opening section.
Figure 15:
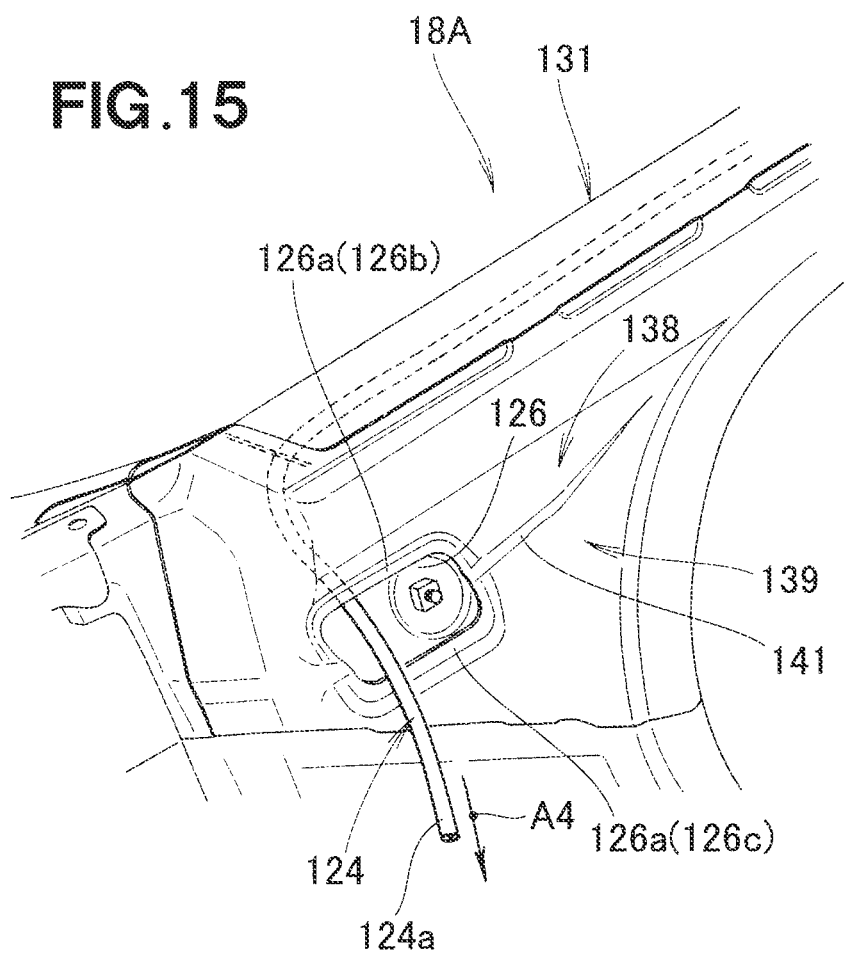
FIG. 15 is a schematic view showing a process of pulling the drain hose of FIG. 14 out of the opening section.

A process of pulling the drain hose 124 out of the front pillar 18A is as follows. First, as shown in FIG. 13, a drain hose 124 that has been passed through the hollow member 131 is pulled out through the front end section 131c of the hollow member 131 as shown by arrow A1. Then, as shown in FIG. 14, the drain hose 124 is guided along the stepped bead 138 to the opening section 126 as shown by arrow A2, then pulled out through the opening section 126 towards the passenger compartment 34 using the opening gradation H2 as shown by arrow A3. Then, as shown in FIG. 15, the drain hose 124 is pulled along a direction shown by arrow A4, and a distal end section 124a of the drain hose 124 is positioned in a predetermined location. This completes the process of pulling out the drain hose 124.

Figure 16:
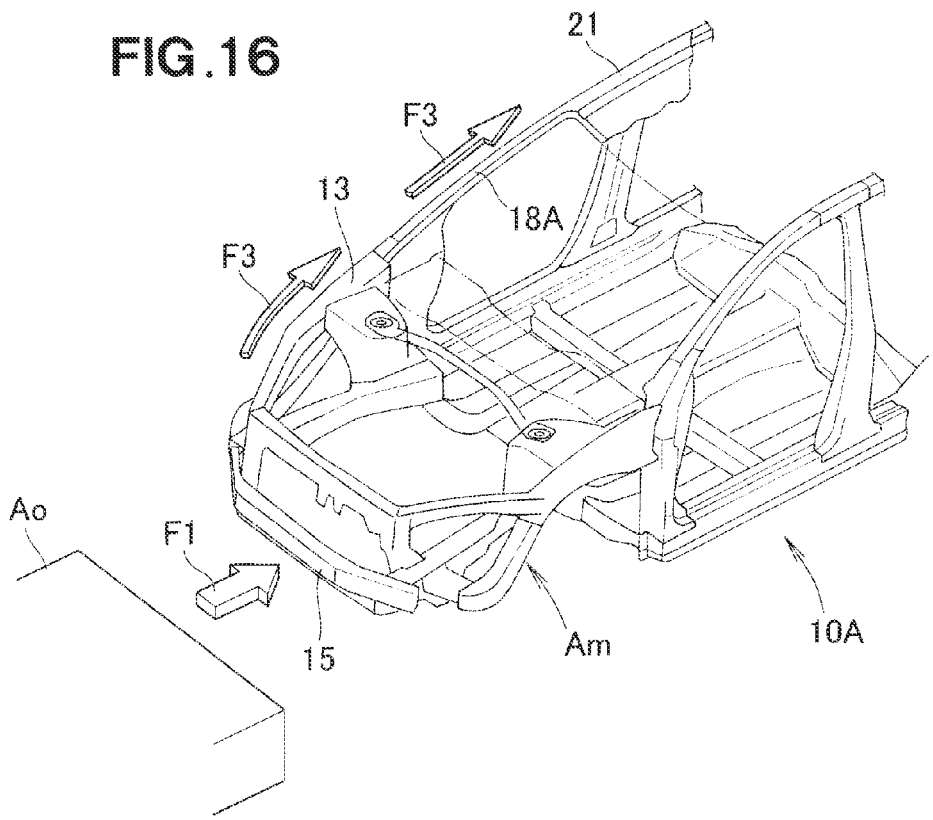
FIG. 16 is a schematic view illustrating an impact load acting on an automobile according to the second embodiment of the present invention.

Next, an example of an impact load acting on the front pillar 18A will be described. As shown in FIG. 16, when the automobile Am collides head-on with an oncoming vehicle Ao, an impact load F1 acts on a center of the front bumper beam 15. A part of the impact load F1 is transmitted as an impact load F3 to the front pillar 18A from the front bumper beam 15 through the right upper arm 13.

Figure 17:
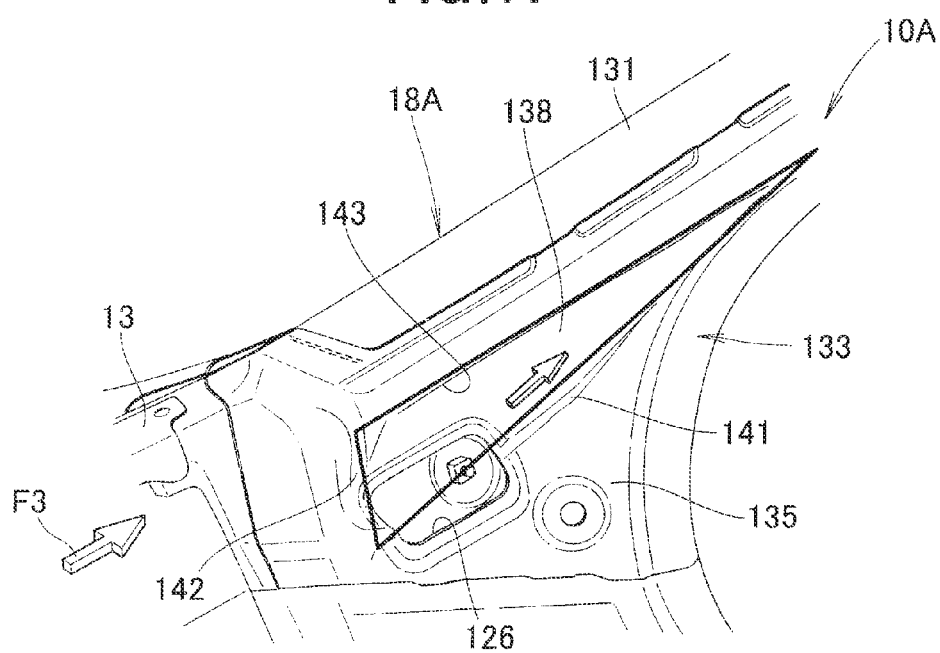
FIG. 17 is a schematic view illustrating an impact load acting on the right front pillar of FIG. 16.

According to the second embodiment, the stepped bead 138 is formed as a triangle so that the lower fold section 141 inclines upwards towards the rear of the vehicle body so as to gradually approach the hollow member 131, as shown in FIG. 17. As a result the stiffness of the lower panel section 135 can be increased. Therefore, the hollow member 131, the lower panel section 135, and the stepped bead 138 can transmit a part of the impact load F3 acting on the front pillar 18A to the rear section of the vehicle body 10A in an efficient manner.

Third Embodiment

Next, a vehicle body 10B of an automobile Am according to a third embodiment will be described with reference to FIGS. 18 through 37. The vehicle body 10B according to the third embodiment has a configuration that is essentially the same as that of the vehicle body 10 according to the first embodiment. A description of the vehicle body 10B will now be given.

Figure 18:
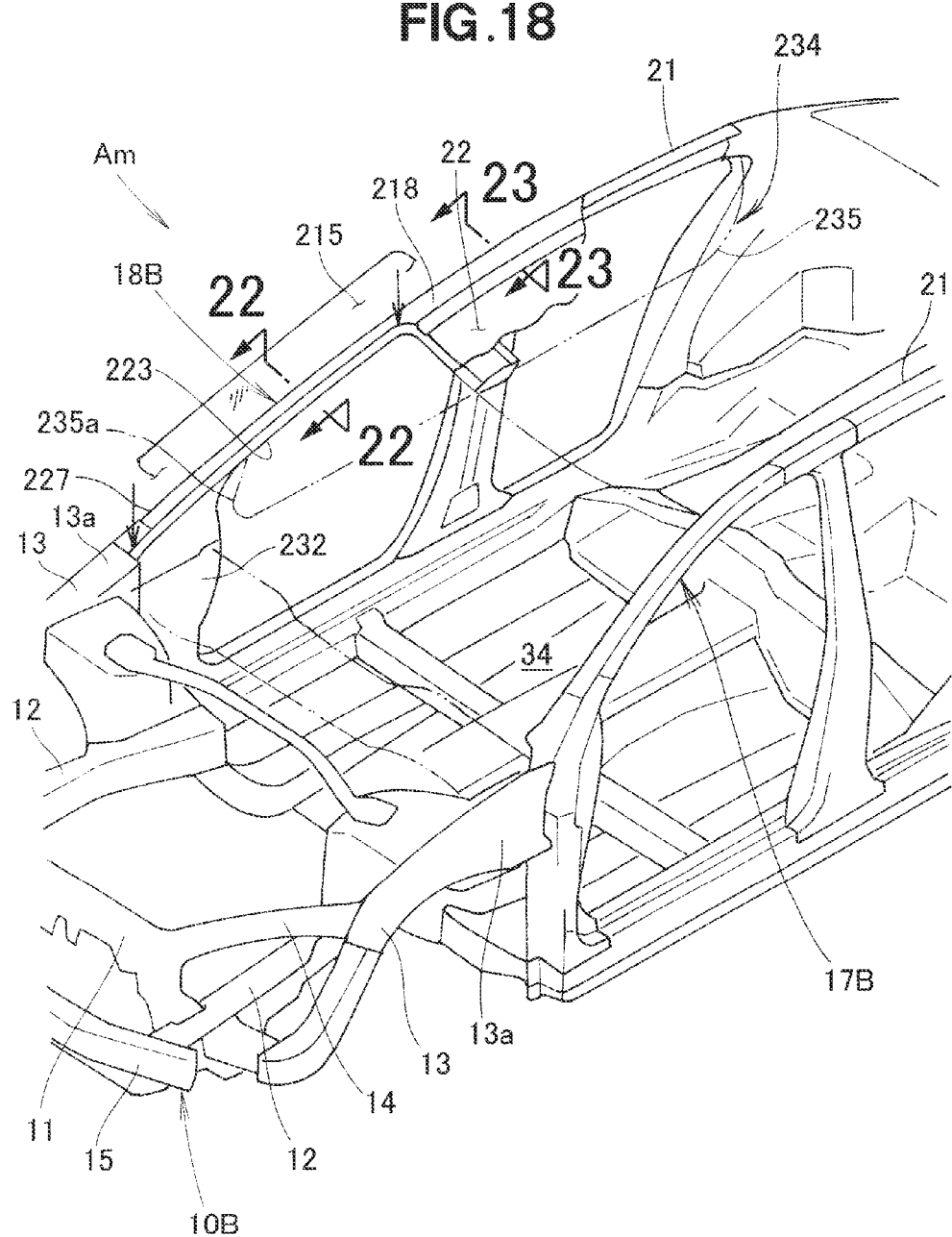
FIG. 18 is a perspective view showing a vehicle body having left and right front pillars according to a third embodiment of the present invention.

As shown in FIG. 18, a front section of the vehicle body 10B has a basic configuration that is essentially the same as that of the vehicle body 10 according to the first embodiment. Left and right front pillars 17B, 18B respectively have a configuration that is essentially the same as that of the left and right front pillars 17, 18 according to the first embodiment. In other words, each of the left and right front pillars 17B, 18B extends at an incline rearwards and upwards from a rear end of the left and right upper frames 13, 13 respectively, and forms a part of a door opening 223 that is opened or closed by a side door. A windshield 215 (i.e., a windscreen 215) is mounted between the left and right front pillars 17B, 18B. Left and right roof side rails 21, 21 respectively extend rearwards from a rear end of each of the left and right front pillars 17B, 18B. The roof 22 is supported by the left and right roof side rails 21, 21.

The left and right front pillars 17B, 18B are members that are bilaterally symmetrical to each other. A description will be given hereafter for the right front pillar 18B only; a description for the left front pillar 17B will be omitted. The right front pillar 18B will hereafter be referred to simply as the front pillar 18B.

The automobile Am is provided with a side curtain airbag device 234. The side curtain airbag device 234 deploys a side curtain airbag 235 along a side wall of the passenger compartment 34, based on information regarding the state of the automobile Am.

Figure 19:
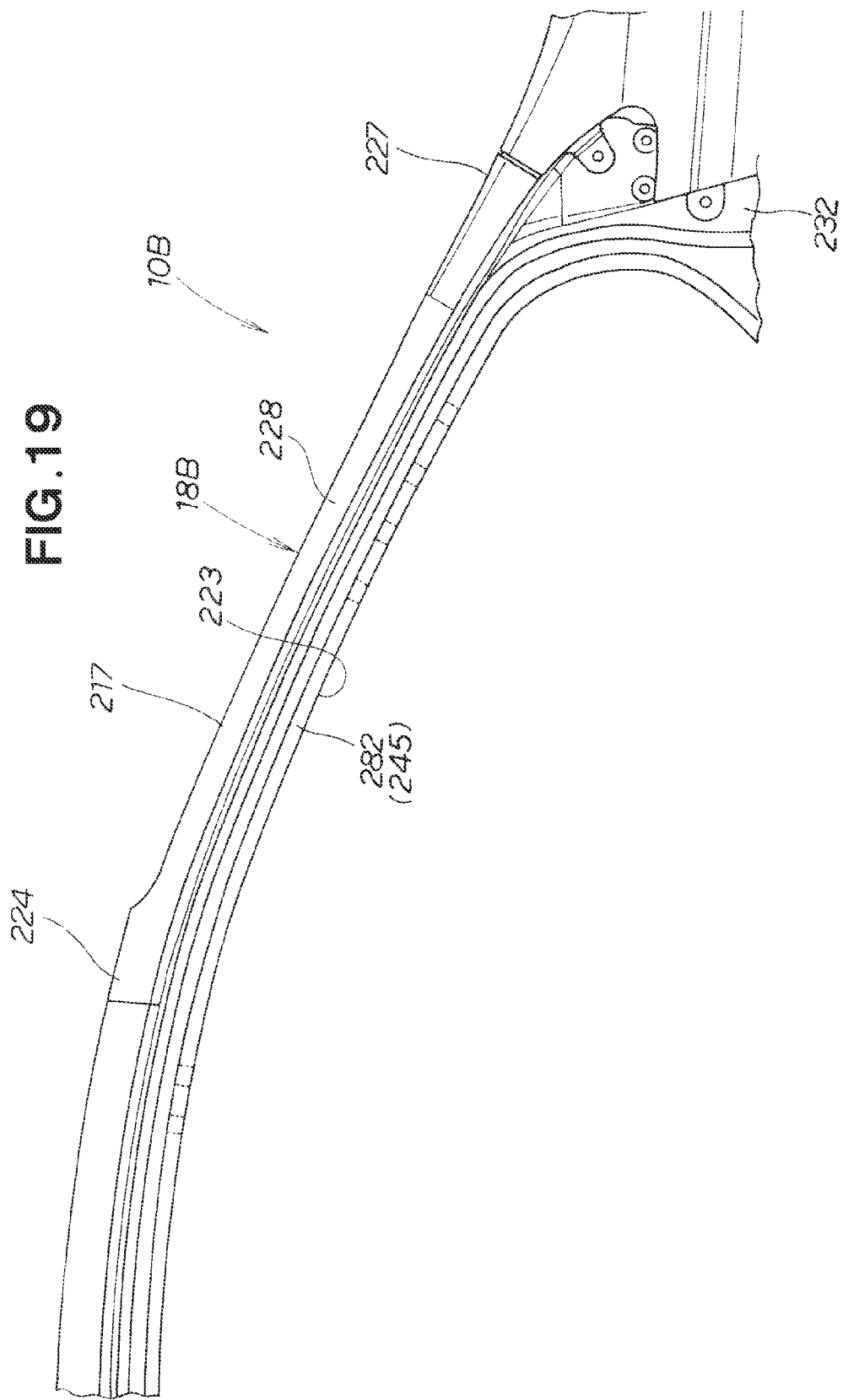
FIG. 19 is a view showing the right front pillar of FIG. 18, as seen from outside a vehicle width direction.
Figure 20:
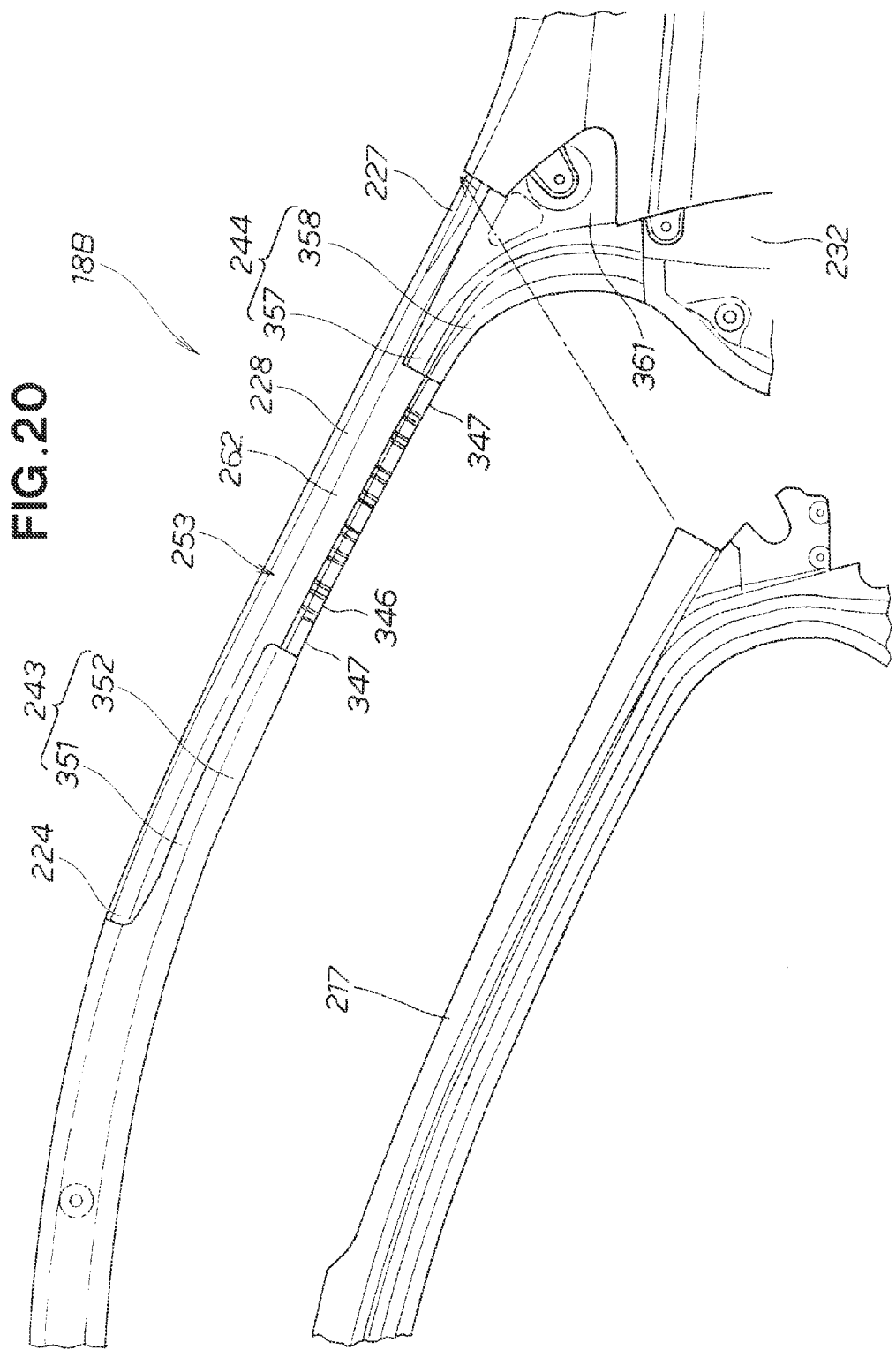
FIG. 20 is an exploded view showing the right front pillar of FIG. 19.
Figure 21:
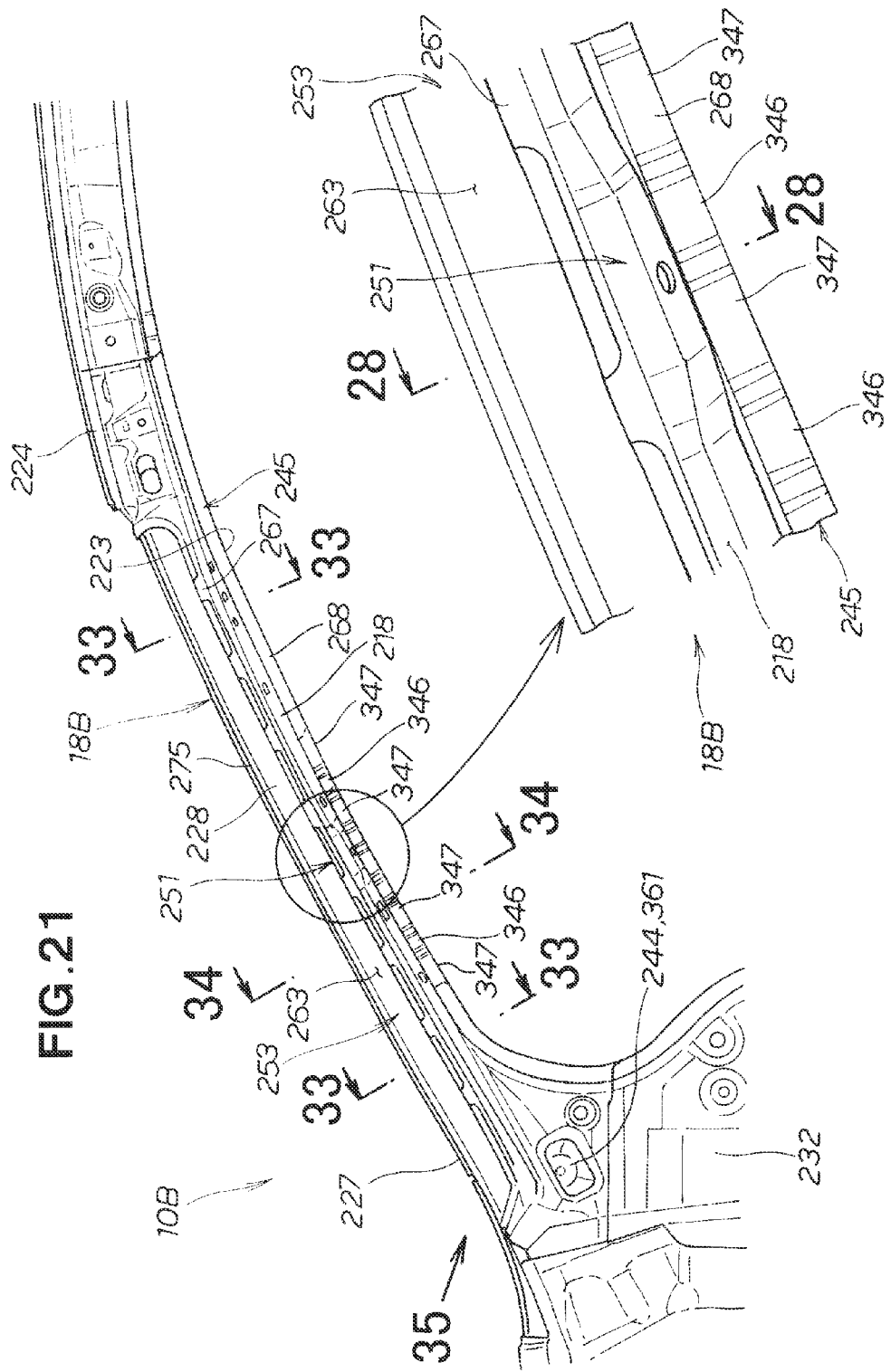
FIG. 21 is a view showing the right front pillar of FIG. 19, as seen from a passenger compartment side.
Figure 22:
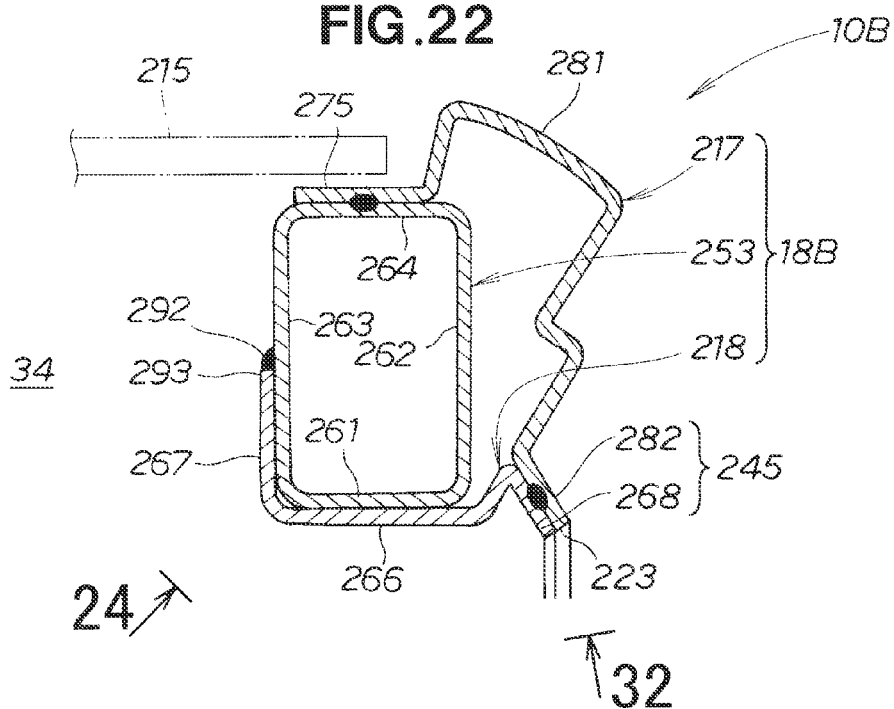
FIG. 22 is a cross-sectional view taken along line 22-22 of FIG. 18.

FIG. 19 shows the right front pillar 18B when the vehicle body 10B is viewed from the right side. FIG. 20 shows a state in which an outer panel 217 has been removed from the front pillar 18B shown in FIG. 19. FIG. 21 shows the right front pillar 18B as viewed from the side facing the passenger compartment 34. FIG. 22 shows a cross section along line 22-22 in FIG. 18, in other words, a cross section of a portion of the front pillar 18B that supports the windshield 215.

As shown in FIGS. 19 through 22, the front pillar 18B comprises a hollow member 253, an outer panel 217, and an inner panel 218. As shown in FIG. 18, a lower front section of the inner panel 218 is joined to a lower inner panel 232 projecting upright from a lower section of the vehicle body 10B. The lower inner panel 232 functions to link the lower section of the vehicle body 10B to a lower front section of the front pillar 18B as part of a "front pillar undersection."

The front pillar 18B has a curved shape, the entirety of which projects to an outside of the vehicle body 10B. Therefore, each of the hollow member 253, the outer panel 217, and the inner panel 218 has a curved shape, the entirety of which projects to the outside of the vehicle body 10B. Specifically, the overall shape of the front pillar 18B is a curve that projects upward, and outward in the vehicle width direction, of the vehicle body 10B.

The hollow member 253 is a long material that functions as a core material of the front pillar 18B, and a front end is joined to a rear end section 13a of the right upper arm 13. The hollow member 253 is made from, for example, a steel material, and is integrally formed by hydroforming so as to have a substantially rectangular closed cross-section. In other words, the hollow member 253 is made of a rectangular pipe. In the third embodiment, substantially rectangular refers to a rectangle, a square, or another quadrilateral.

As shown in FIGS. 21 and 22, the hollow member 253 is formed by four sides, namely four wall sections 261 through 264, so as to have a rectangular cross section. The four wall sections 261 through 264 are an inner lower wall section 261 located at a bottom, an outer wall section 262 located at an outside in the vehicle width direction, an inner wall section 263 located on at inside in the vehicle width direction, and an outer upper wall section 264 located at a top.

As shown in FIG. 22, the outer panel 217 is, for example, a folded molded article made of a steel plate, and comprises an outer panel body 281, a first outer flange 282, and a second outer flange 275. The outer panel body 281 has a substantially U-shaped cross section, opens towards the outside wall section 262, and has the first and second outer flanges 282, 275 provided to both ends of the opening. The first outer flange 282 (i.e., a first flange 282) is positioned near a corner between the inner lower wall section 261 and the outer wall section 262. A distal end of the first outer flange 282 is positioned away from the corner between the inner lower wall section 261 and the outer wall section 262.

The second outer flange 275 (i.e., a second flange) extends along the outer upper wall section 264 to a vicinity of a corner between the outer upper wall section 264 and the inner wall section 263. A windshield 215 is attached to an upper surface of the second outer flange 275 with a sealing member (not shown) interposed therebetween. In other words, the second outer flange 275 functions as a windshield attachment section (i.e., a window frame). The second outer flange 275 will hereafter be referred to as a windshield attachment section 275 or a windshield attachment flange section 275 as appropriate.

As shown in FIG. 22, the inner panel 218 is, for example, a folded molded article made of a steel plate, formed so as to enclose a lower section of the hollow member 253. The inner panel 218 comprises an inner panel body 266, a first inner flange 268, and a second inner flange 267.

As shown in FIGS. 20 through 22, the inner panel body 266 comprises a flat plate that overlaps and is joined to the inner lower wall section 261. The first inner flange 268 extends from an end of the inner panel body 266 on the outside in the vehicle width direction so as to lie along a lower surface of the first outer flange 282 of the outer panel 217. The first inner flange 268 overlaps with and joins to the first outer flange 282 of the outer panel 217 from below. The flanges 268, 282 thus integrated by joining are capable of functioning as a member for reinforcing the hollow member 253. As a result, the stiffness of the front pillar 18B is increased. The integrated flanges 268, 282 form a rim section 245 of the door opening 223. The rim section 245 functions as a seal attachment section for attaching a sealing material 53 (see FIG. 22). The rim section 245 shall hereafter be referred to as a seal attachment section 245.

The second outer flange 275 of the outer panel 217 is caused to overlap the outer upper wall section 264 of the hollow member 253, and is joined by indirect spot welding. The second inner flange 267 of the inner panel 218 is caused to overlap inner wall section 263 of the hollow member 253, and is joined by MIG welding. Therefore, the second outer flange 275 and the second inner flange 267 are joined separately, and no not need to be joined so as to overlap each other. The size of each of the outer panel 217 and the inner panel 218 can be reduced by an amount corresponding to the extent to which the second outer flange 275 and the second inner flange 267 do not overlap. Therefore, the weight of the front pillar 18B can be reduced.

Figure 23:
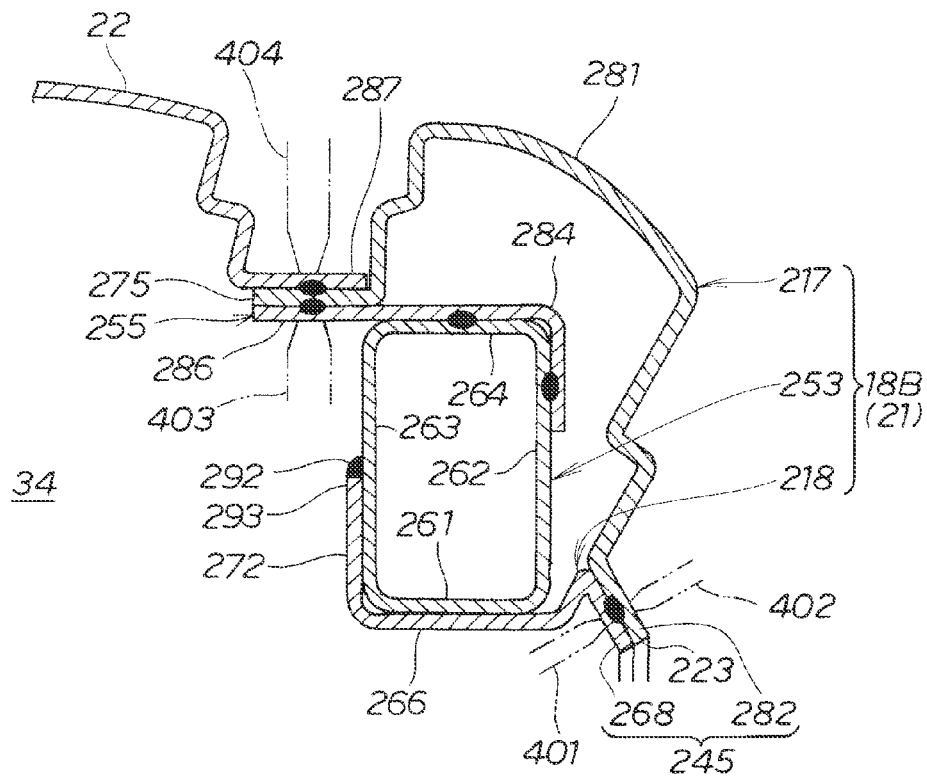
FIG. 23 is a cross-sectional view taken along line 23-23 of FIG. 18.

The second outer flange 275 shown in FIG. 22 and the second outer flange 275 shown in FIG. 23 will now be compared and described. The second outer flange 275 shown in FIG. 23 extends further towards the passenger compartment 34 than the hollow member 253 so that a flange section 287 of the roof 22 can be joined by direct spot welding. Joining can therefore be readily performed.

Meanwhile, the second outer flange 275 shown in FIG. 22 also functions as the windshield attachment section 275 for attaching the windshield 215. In other words, the windshield attachment section 275 is only used for attaching the windshield 215, and therefore does not need to extend towards the passenger compartment 34. Since the windshield attachment section 275 does not extend towards the passenger compartment 34, the visibility range forwards of the vehicle body from a passenger compartment (i.e., the visual field) through the windshield 215 is larger by a corresponding amount.

As described above, even through the hollow member 253 is used as the core material for the front pillar 18B, the flange section 287 of the roof 22 can be readily and reliably joined to the front pillar 18B while an adequate visibility range forward of the vehicle body from the passenger compartment 34 is obtained.

Figure 26:
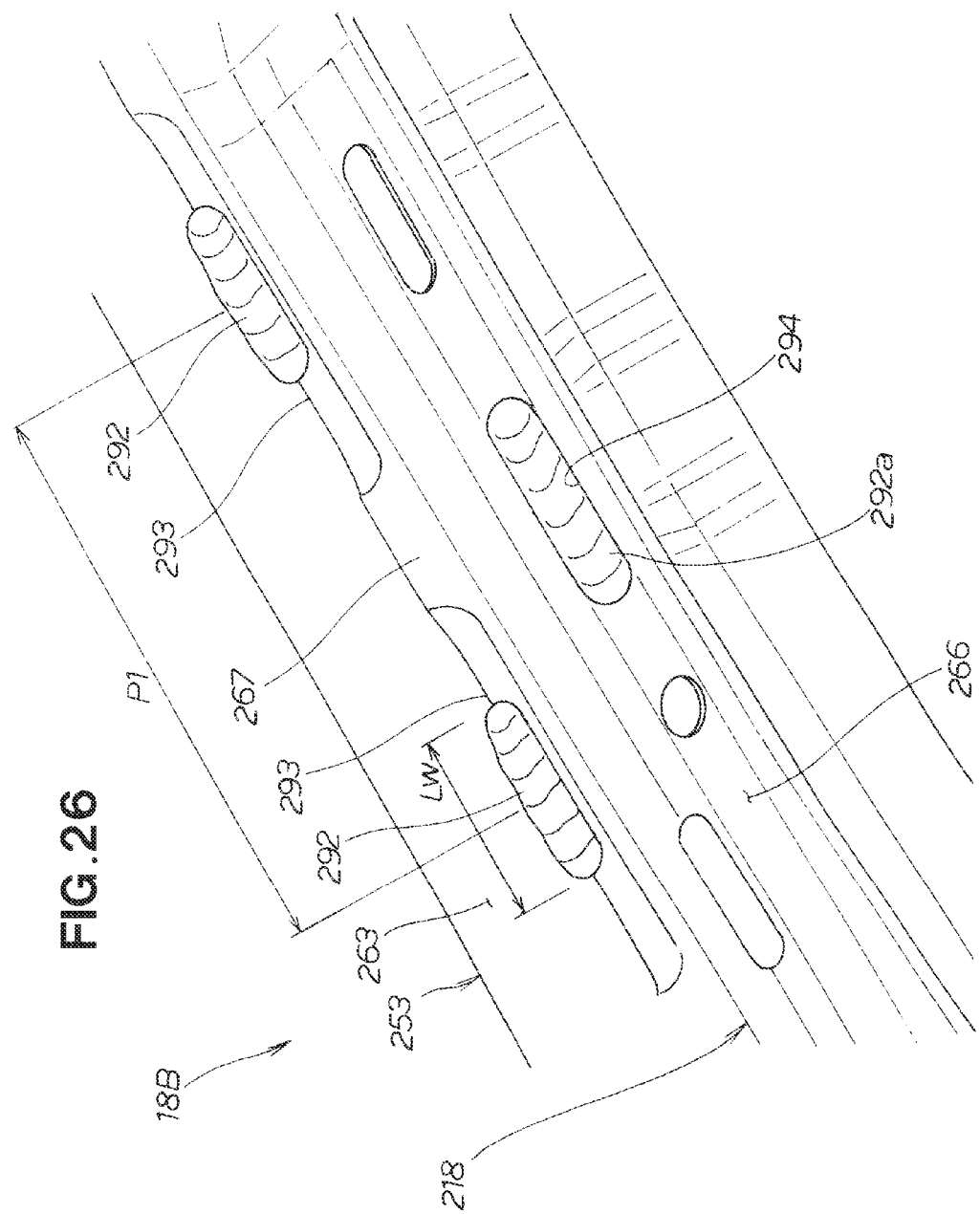
FIG. 26 is a view showing on an enlarged scale section 26 of FIG. 24.

As shown in FIGS. 24 through 27, the second inner flange 267 extends upwards, from an end of the inner panel body 266 located inwards in the vehicle width direction, so as to lie along an inner wall section 263. The second inner flange 267 overlaps the inner wall section 263 up to half the height of the inner wall section 263. The second inner flange 267 has a plurality of joint sections 293 provided to an upper end. As shown in FIG. 26, the joint sections 293 are arranged at a predetermined pitch P1 along the longitudinal direction of the hollow member 253, and are joined to the inner wall section 263 by MIG welding. A first welded metal section 292 at a portion where the joint sections 293 has been welded has a length Lw. The pitch P1 varies as appropriate depending on the position of the joint.

Figure 24:
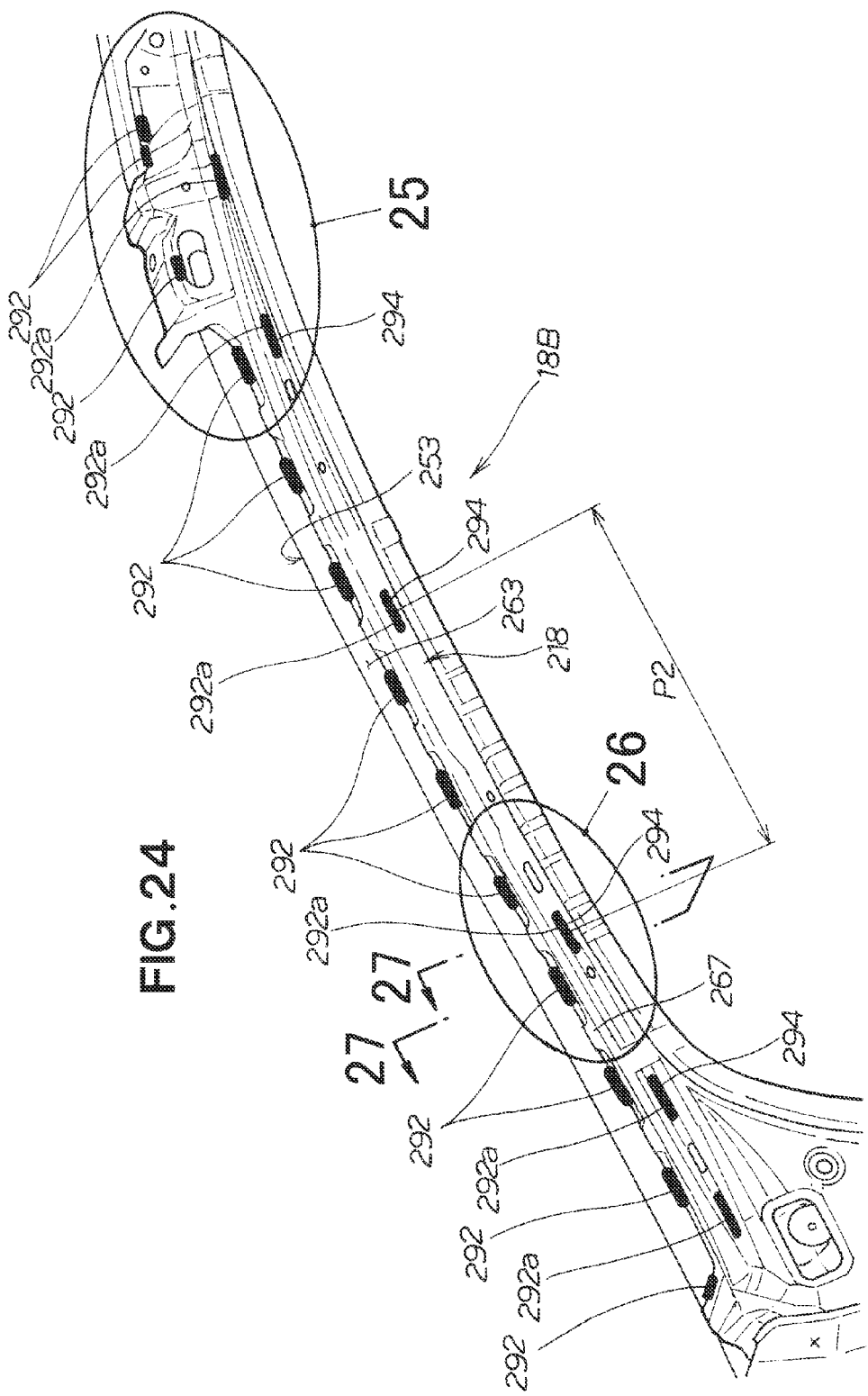
FIG. 24 is a view showing the right front pillar of FIG. 22, as seen in the direction of arrow 24.
Figure 25:
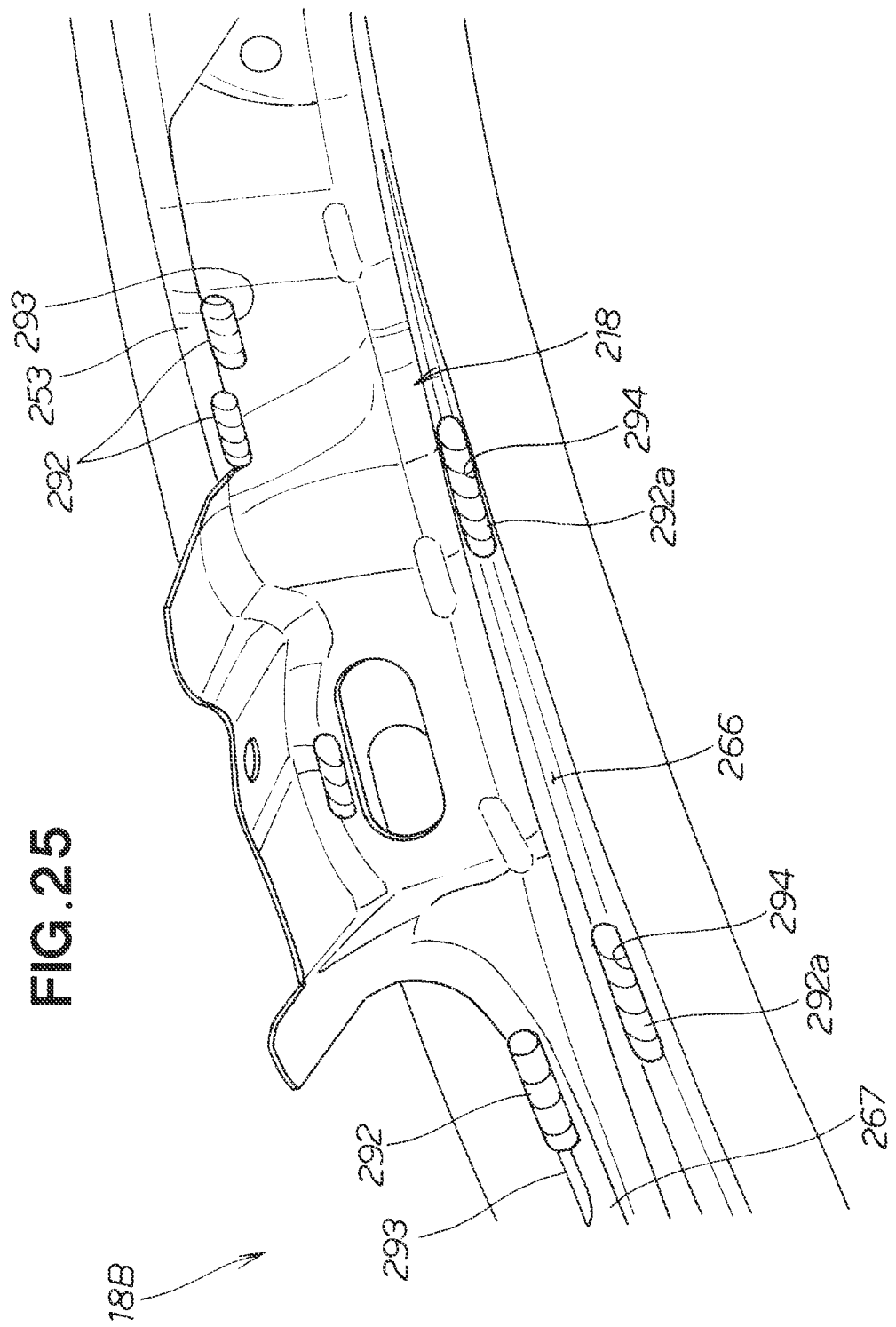
FIG. 25 is a view showing on an enlarged scale section 25 of FIG. 24.

A specific configuration of joining the inner panel body 266 to the inner lower wall section 261 shall now be described. As shown in FIGS. 24 through 27, the inner panel body 266 has a plurality of through-holes 294 for welding. As shown in FIG. 24, the through-holes 294 are arranged at a predetermined pitch P2 along the longitudinal direction of the hollow member 253, and are joined to the inner lower wall section 261 by MIG welding. In other words, the inner panel body 266 is welded to the inner lower wall section 261 by a plurality of second welded metal sections 292a. The pitch P2 varies as appropriate depending on the position of the joint.

The first welded metal section 292 and the second welded metal sections 292a are elongated in the longitudinal direction of the hollow member 253. Also, the first welded metal section 292 and the second welded metal sections 292a are arranged along the longitudinal direction of the hollow member 253 in a staggered manner. Therefore, the strength at which the inner panel 218 joins the hollow member 253 can be further increased.

In order to weld the inner panel 218 to the hollow member 253, the second inner flange 267 thus has a plurality of the joint sections 293 provided to the upper end. Therefore, the joint formed by welding can be made stronger than when the inner panel 218 is joined to the hollow member 253 by spot welding. Therefore, the inner panel 218 can transmit loads acting on the 18b in a reliable manner.

Figure 27:
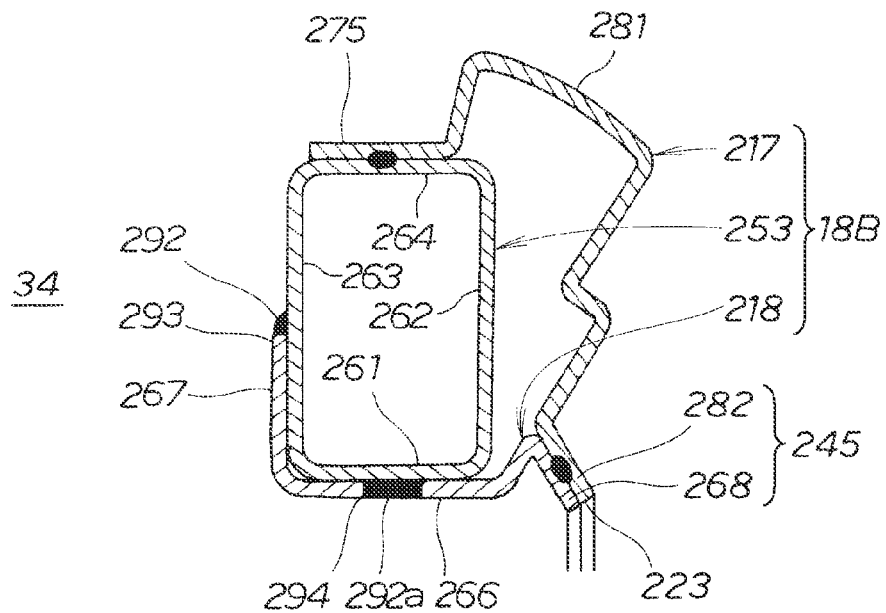
FIG. 27 is a cross-sectional view taken along line 27-27 of FIG. 24.
Figure 28:
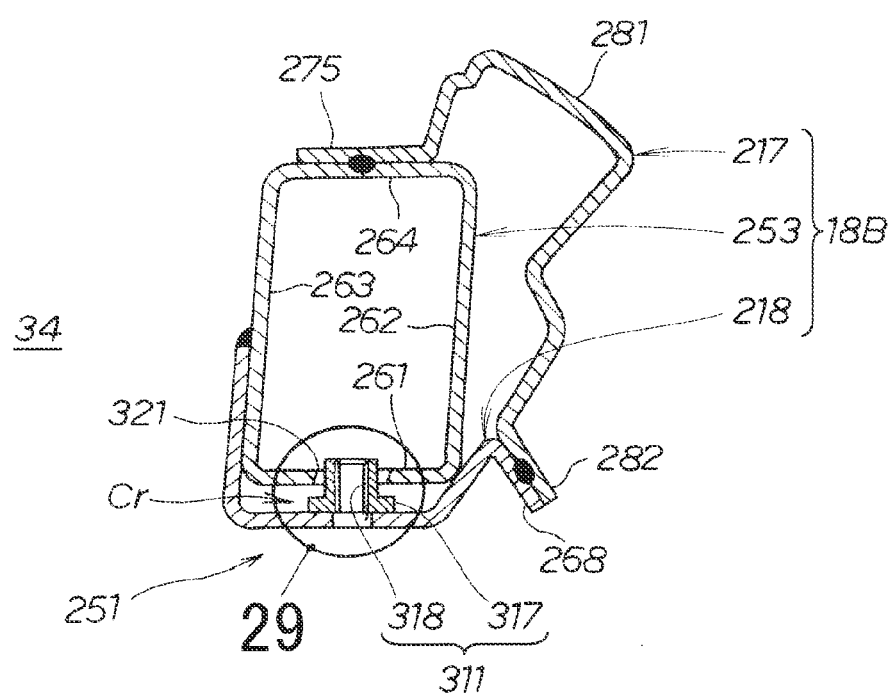
FIG. 28 is a cross-sectional view taken along line 28-28 of FIG. 21.
Figure 29:
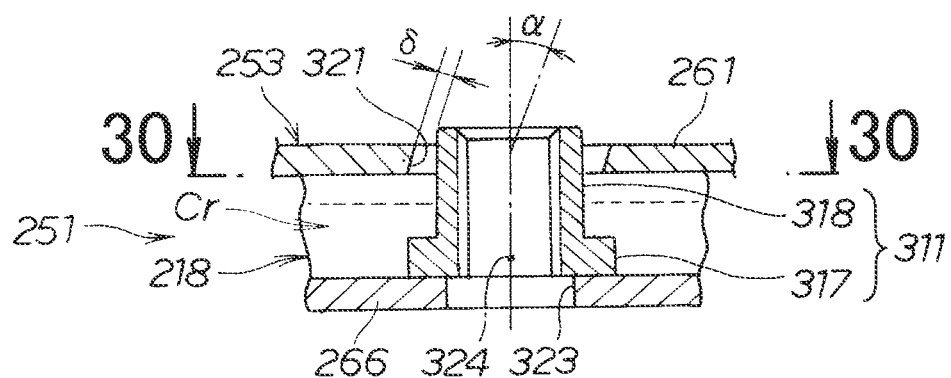
FIG. 29 is a view showing on an enlarged scale section 29 of FIG. 28.

Also, as shown in FIG. 27, in order to weld the inner panel 218 to the hollow member 253, the inner panel body 266 is provided with the through-holes 294 for welding. Therefore, the joint formed by welding can be made stronger than when the inner panel 218 is joined to the hollow member 253 by spot welding. Therefore, the inner panel 218 can transmit loads acting on the 18b in a reliable manner.

FIG. 23 shows a cross section along line 23-23 in FIG. 18; i.e., a cross section of a portion in which the roof side rail 21 is joined to the roof 22. The roof side rail 21 has a cross-sectional configuration that is substantially the same as that of the front pillar 18B, and component members that are identical are therefore affixed with identical numerals. In other word, the roof side rail 21 comprises the hollow member 253, the outer panel 217, and the inner panel 218.

As shown in FIGS. 18, 21, and 23, the outer panel body 281 of the roof side rail 21 has a substantially U-shaped cross section, opens towards the outer wall section 262 and the outer upper wall section 264, and has the first and second outer flanges 282, 275 provided to both ends of the opening.

The first outer flange 282 has a configuration identical to that shown in FIG. 22. The two flanges 268, 282 are joined to each other by spot welding. In other words, the two flanges 268, 282 in a state of overlapping each other are sandwiched by a pair of electrodes 401, 402. Next, an electrical current is supplied between the electrodes 401, 402, thereby joining the flanges 268, 282 by direct spot welding.

As can be seen from the above description, each of the overlapped flanges 268, 282 is shaped so as to extend away from the hollow member 253 and is outwardly exposed. Each of the flanges 268, 282 can thereby be sandwiched between the pair of electrodes 401, 402, and can therefore be joined by spot welding. Therefore, despite the hollow member 253 being used for the core material of the roof side rail 21, the specifications of the spot welding equipment can be substantially equivalent to those required conventionally, and it becomes possible to continue reducing the size of spot welding equipment. Also, since it is possible to use regular spot welding electrodes to directly sandwich and press the two flanges and perform spot welding, as a result, even though the hollow member 253 is used, welding conditions required for spot welding are substantially identical to those required conventionally, and spot welding can be readily performed.

The second outer flange 275 extend substantially horizontally towards the passenger compartment 34 from a vicinity of a corner between the inner wall section 263 and the outer upper wall section 264. The second outer flange 275 (i.e., a roof-joining outer flange section 275) thus protrudes further towards the passenger compartment 34 relative to the sealing material 53. The flange section 287 of the roof 22 is attached to an upper surface of the second outer flange 275.

A roof-joining extended flange section 255 is interposed between the outer upper wall section 264 and the second outer flange 275. The roof-joining extended flange section 255 comprises a substantially L-shaped base section 284 and an extended flange 286 continuing from the base section 284. The L-shaped base section 284 is joined to both of the outer wall section 262 and the outer upper wall section 264. Joining the L-shaped base section 284 to the outer upper wall section 264 is optional, and may be performed as appropriate.

The extended flange 286 is a horizontal flat plate extending from the L-shaped base section 284 towards the passenger compartment 34 along the outer upper wall section 264. The second outer flange 275 and the flange section 287 of the roof 22 are sequentially overlapped on the extended flange body 286. The three flanges 286, 275, 287 are joined to each other by spot welding.

In other words, the roof 22 and the outer panel 217 are joined as follows. The three flanges 286, 275, 287 in a state of overlapping each other are sandwiched between a pair of electrodes 403, 404. Next, a current is supplied between the electrodes 403, 404, thereby joining the flanges 286, 275, 287 by direct spot welding.

As can be seen from the above description, the overlapped flanges 286, 275, 287 are shaped so as to extend away from the hollow member 253, and are outwardly exposed. As a result, the flanges 286, 275, 287 can be sandwiched between the electrodes 403, 404, and joining by direct spot welding can therefore be performed. Therefore, even though the hollow member 253 was used as a core material of the roof side rail 21, the specifications of the spot welding equipment can be substantially equivalent to those required conditionally, and it becomes possible to continue reducing the size of spot welding equipment. Also, since it is possible to use regular spot welding electrodes to directly sandwich and press the three flanges and perform spot welding, as a result, even though the hollow member 253 is used, welding conditions required for spot welding are substantially identical to those required conventionally, and spot welding can be readily performed. The shape of the base section 284 is discretionary, and a method for welding the base section 284 to the hollow member 253 is also discretionary.

As shown in FIG. 21 and FIGS. 28 through 32, the front pillar 18B is provided with a support section 251 for supporting another member. The support section 251 is capable of supporting, e.g., a main side curtain airbag body 235 shown in FIG. 18 on the front pillar 18B. In such a case, the support section 251 can attach a front portion 235a, or a predetermined position in a longitudinal direction, of the main side curtain airbag body 235 to the front pillar 18B.

As shown in FIGS. 28 through 32, at portion of the front pillar 18 having the airbag support section 251, a predetermined gap Cr is provided between the inner lower wall section 261 and the inner panel body 266. The airbag support section 251 comprises a plate nut 311. The plate nut 311 is an integrally molded item comprising a plate section 317 (i.e., a flange section 317) and a nut section 318. The plate nut 311 is attached to another member by welding, and is therefore also called a welded nut.

Figure 30:
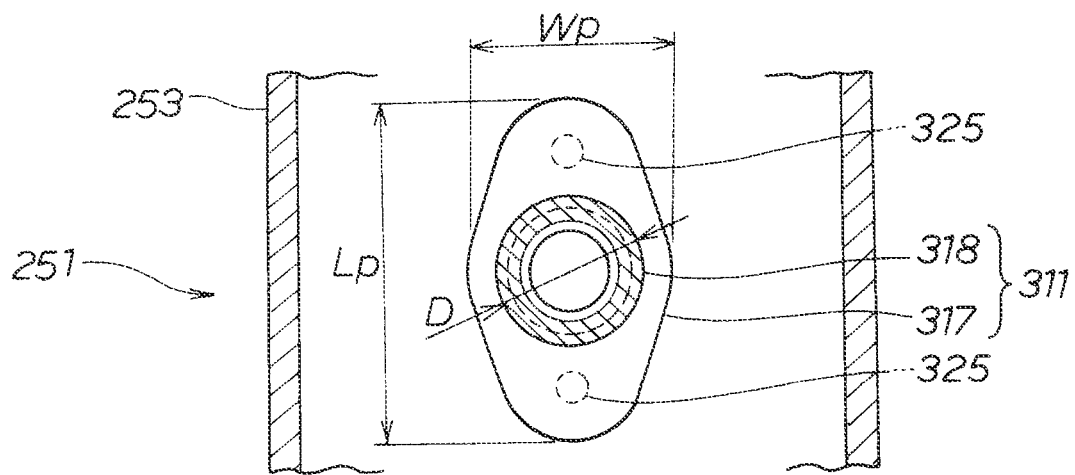
FIG. 30 is a cross-sectional view taken along line 30-30 of FIG. 21.
Figure 31:
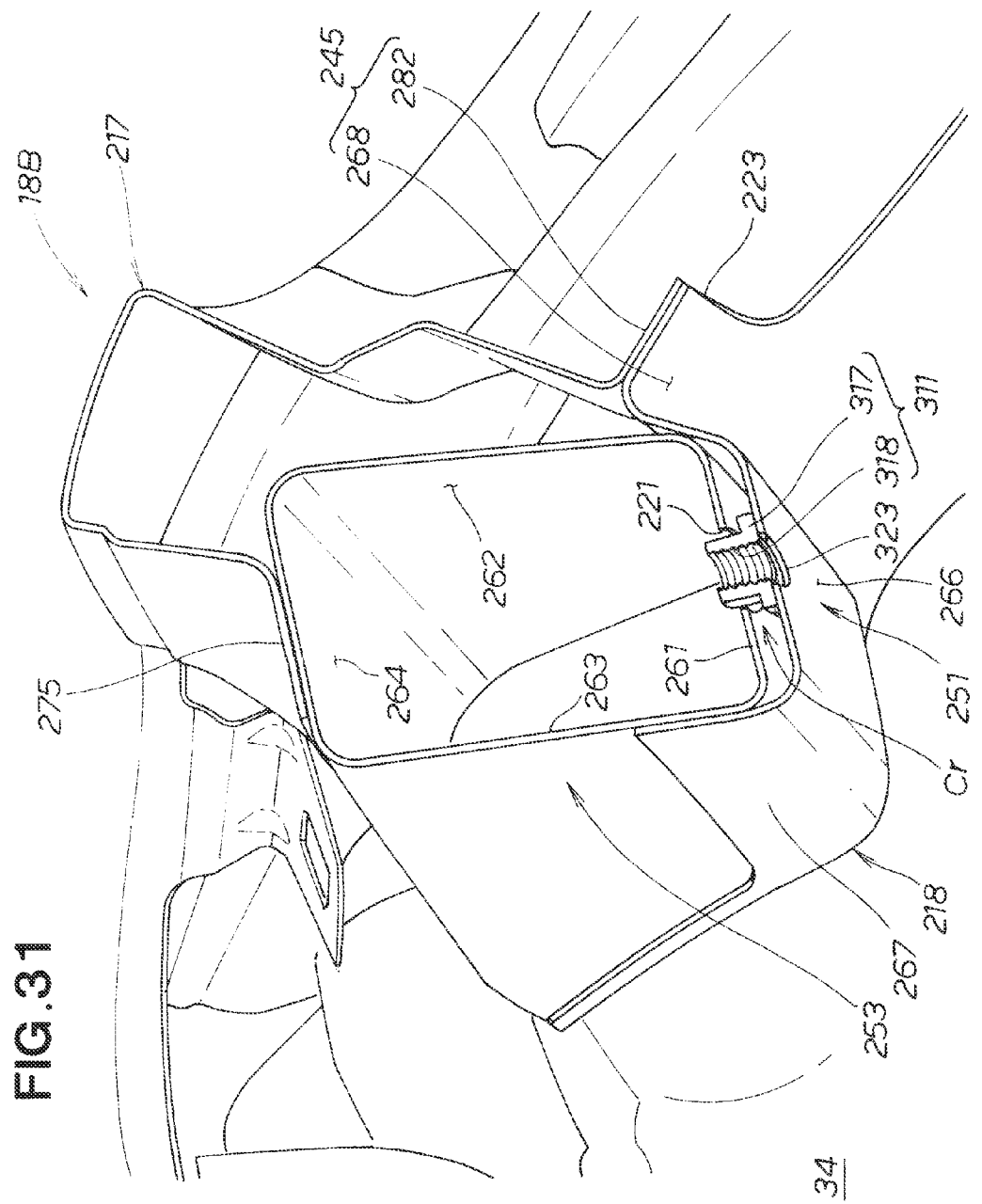
FIG. 31 is a perspective view a region around an airbag support section of the right front pillar of FIG. 28.

The plate section 317 is a flat plate that overlaps and is joined to the inner panel body 266, within the gap Cr. For example, as shown in FIG. 30, the plate section 317 is joined to the inner panel body 266 by a nugget 325. A nugget is a portion on a welded section that has melted and set when the plate section 317 overlaps and is welded onto the inner panel body 266. The nut section 318 is a cylinder extending from a plate surface of the plate section 317 towards the inner lower wall section 261, and has a female thread penetrating within. The outer diameter D of the nut section 318 is smaller than the width Wp or the length Lp of the plate section 317, and is smaller than a minimum width of a regular hexagonal nut. The inner panel body 266 has a through-hole 323 provided coaxially with a center line 324 through the nut section 318. The through-hole 323 has a diameter that is larger than that of the female thread in the nut section 318.

The inner lower wall section 261 is penetrated by a nut relief hole section 321 provided coaxially with the center line 324 through the nut section 318. The nut relief hole section 321 is provided so as to be disposed at an incline relative to the center line 324 through the nut section 318, and so that a gap δ is provided between an edge of the nut relief hole section 321 and the nut section 318. Specifically, the nut relief hole section 321 is inclined at an angle α relative to the center line 324 of the nut section 318 so as to be oriented inwardly with respect to the automobile 12. In other words, the nut relief hole section 321 is oriented towards a direction from which the inner panel 218 having the plate nut 311 attached thereto is fitted onto the hollow member 253.

In the plate nut 311 attached to the front pillar 18B, the nut section 318 is capable of having a bolt (not shown) screwed thereinto. The main side curtain airbag body 235 (FIG. 18) can be attached to the front pillar 18B by the plate nut 311 and the bolt.

According to the second embodiment, the plate nut 311 is thus used instead of a hexagonal nut or another common nut. Furthermore, the nut relief hole section 321 penetrated by the nut section 318 is formed on the hollow member 253. Therefore, the nut relief hole section 321 provided to the hollow member 253 can be made smaller than when a common nut is used.

Also, the nut relief hole section 321 is provided at an incline relative to the center line 324 through the nut section 318. Therefore, the size of the nut relief hole section 321 can be made smaller, despite there being provided a space 8 for preventing interference when the inner panel 218 having the plate nut 311 attached thereto is fitted onto the hollow member 253.

Figure 33:
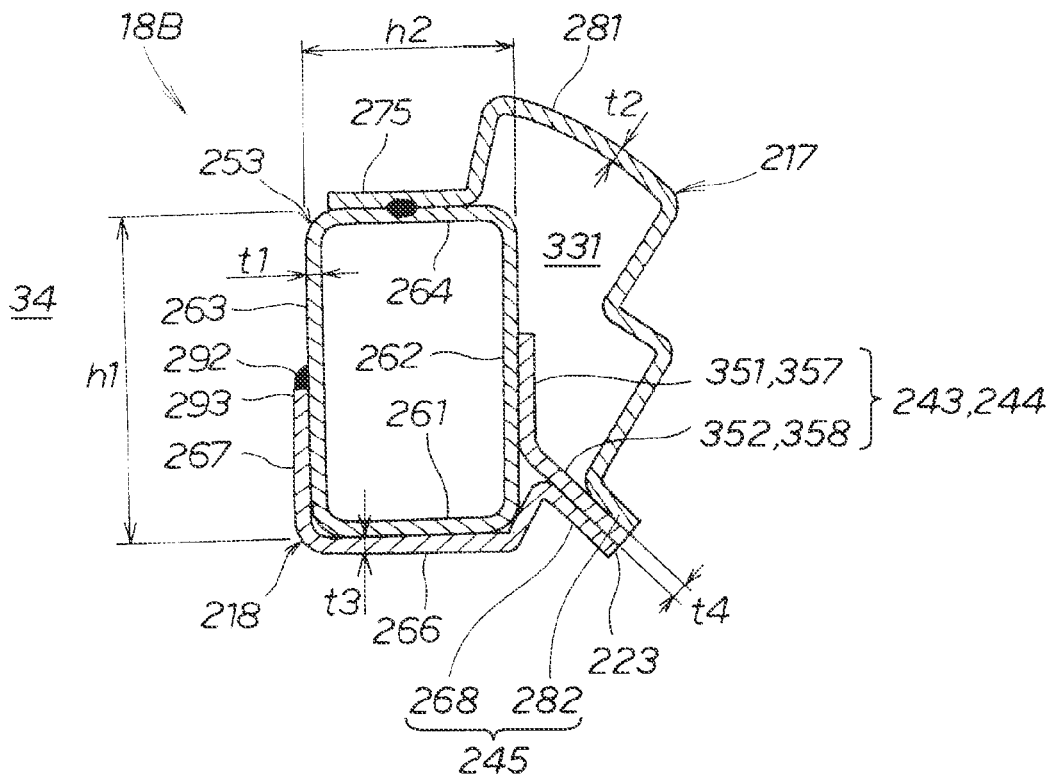
FIG. 33 is a cross-sectional view taken along line 33-33 of FIG. 21.
Figure 34:
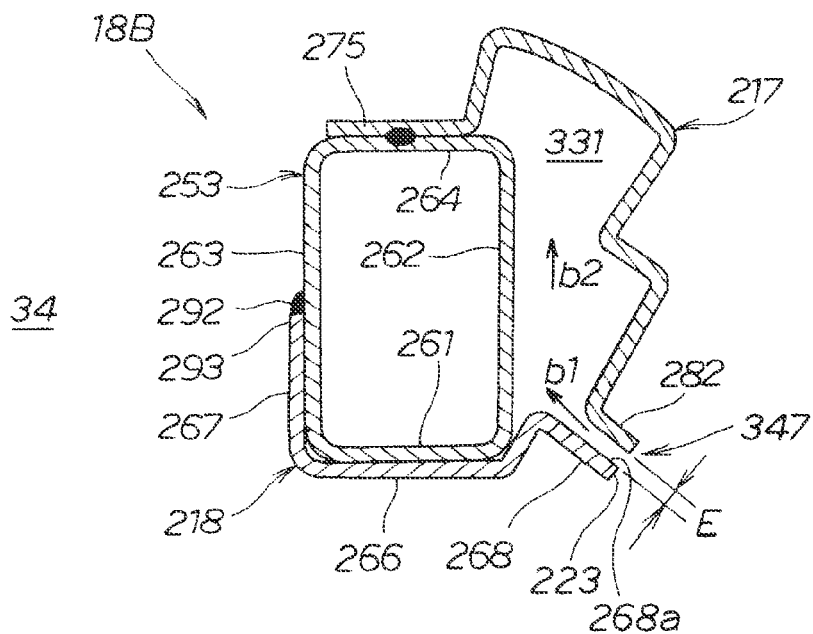
FIG. 34 is a cross-sectional view taken along line 34-34 of FIG. 21.
Figure 35:
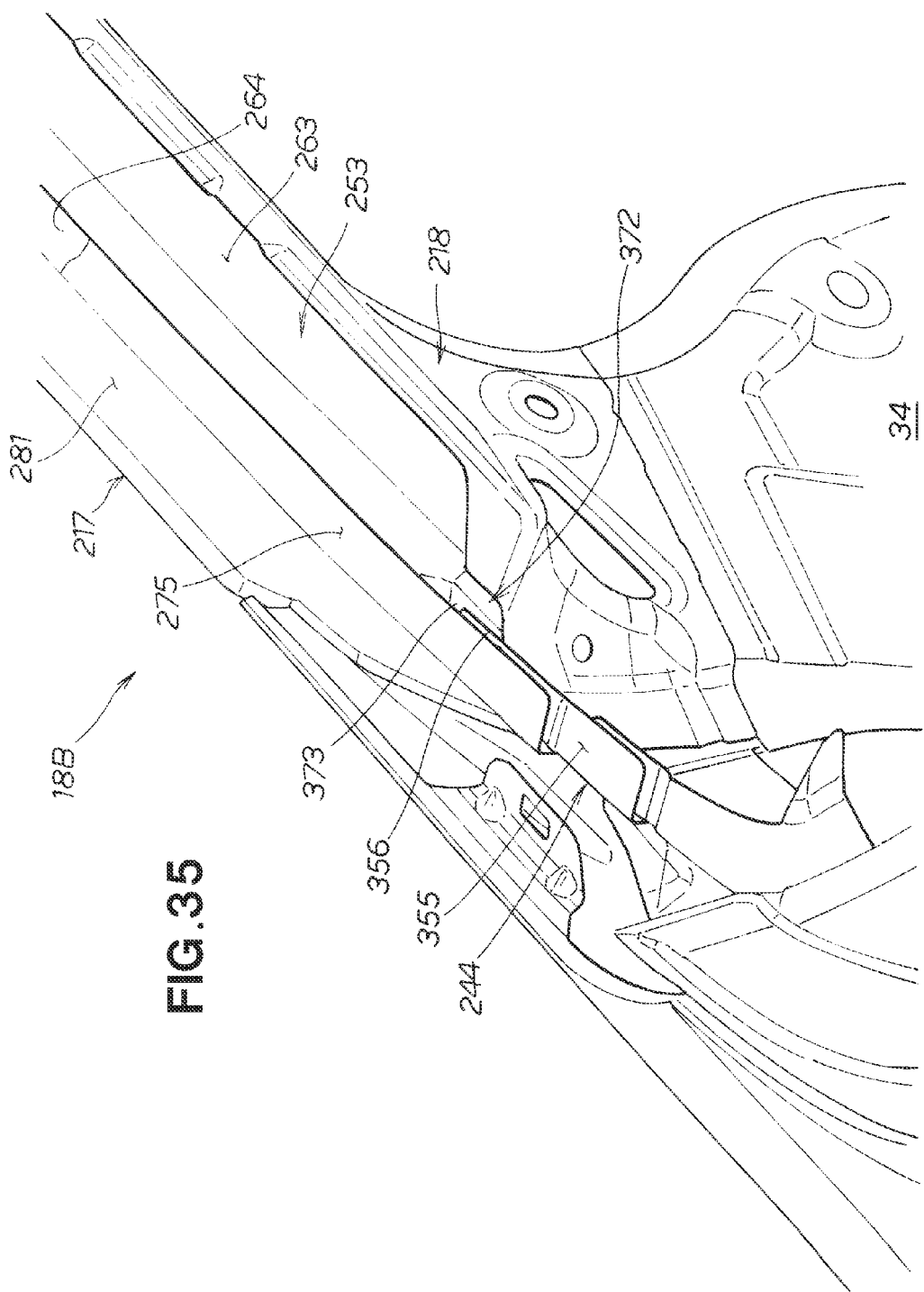
FIG. 35 is a view showing the right front pillar of FIG. 21, as seen in the direction of arrow 35.

As shown in FIGS. 33 through 35, the second outer flange 275 of the front pillar 18B also functions as a windshield attachment section for attaching the windshield 215 (see FIG. 18).

Figure 32:
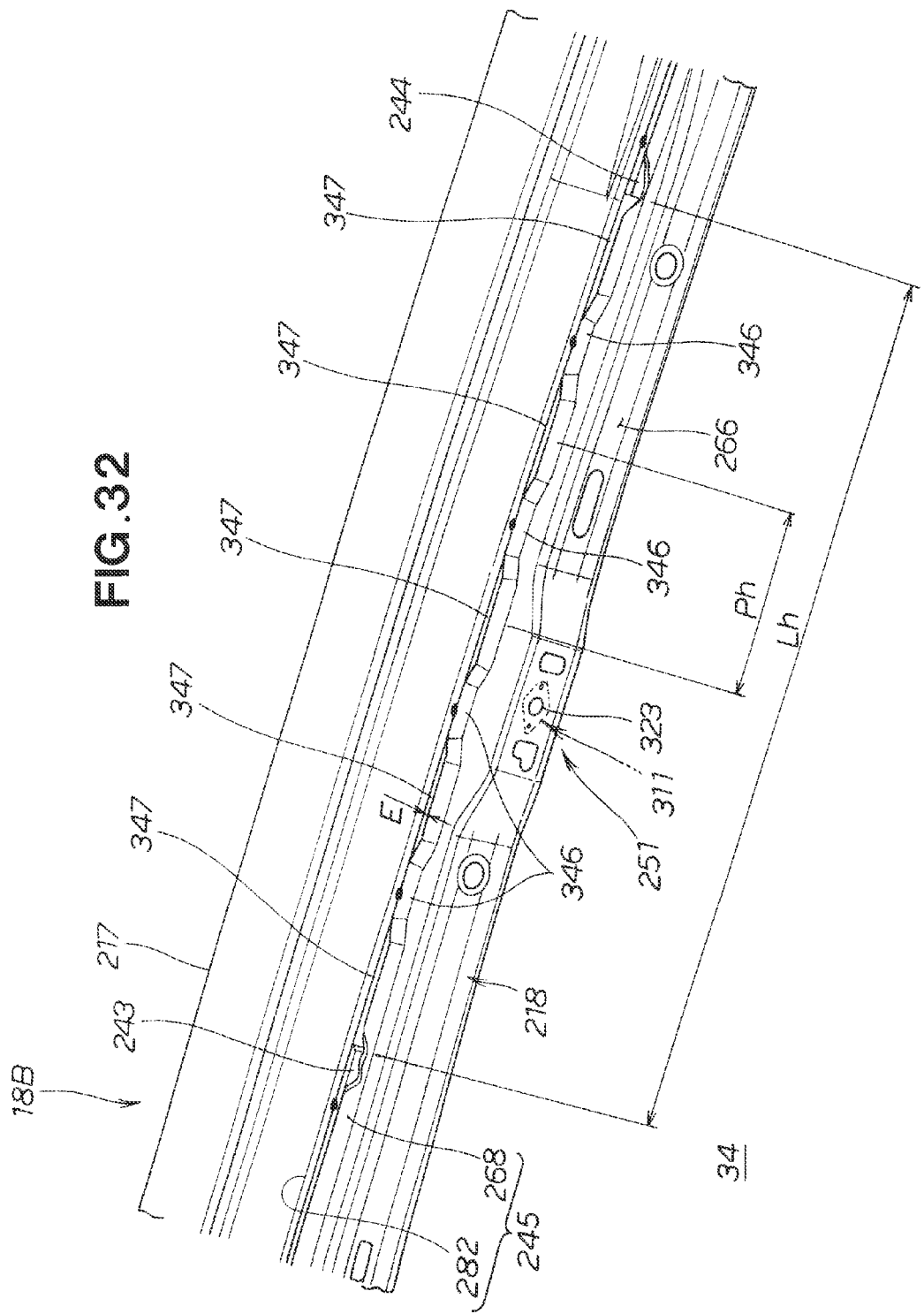
FIG. 32 is a view showing the right front pillar of FIG. 22, as seen in the direction of arrow 32.

As shown in FIGS. 20, 21 and 32, a rear end section 224 and a front end section 227 of the front pillar 18B require a higher stiffness than an intermediate section 228. Therefore, the rear end section 224 of the front pillar 18B is reinforced by a rear section reinforcing member 243. Similarly, the front end section 227 of the front pillar 10B is reinforced by a front section reinforcing member 244.

As shown in FIGS. 20, 32, and 33, the rear section reinforcing member 243 comprises a reinforcing section 351 joined to a hollow material, and a reinforcing section 352 sandwiched between and joined to the inner and outer panels. The reinforcing section 351 joined to a hollow material is joined to the outer wall section 262 within a closed void section 331 enclosed by the hollow member 253, the outer panel 217, and the inner panel 218. The reinforcing section 352 sandwiched between and joined to the inner and outer panels is interposed between the first outer flange 282 of the outer panel 217 and the first inner flange 268 of the inner panel 218. The three members 282, 268, 351 are overlapped with each other and joined to each other by spot welding.

As shown in FIGS. 20, 32, and 33, the front section reinforcing member 244 has a configuration similar to that of the rear section reinforcing member 243. In other words, the front section reinforcing member 244 comprises a reinforcing section 357 joined to a hollow material and a reinforcing section 358 sandwiched between and joined to the inner and outer panels. The reinforcing section 357 joined to a hollow material is joined to the outer wall section 262 within a closed void section 331. The reinforcing section 358 sandwiched between and joined to the inner and outer panels is interposed between the first outer flange 282 of the outer panel 217 and the first inner flange 268 of the inner panel 218. The three members 282, 268, 358 are overlapped with each other and joined to each other by spot welding. As shown in FIGS. 20 and 21, the front section reinforcing member 244 has a joint section 361 provided to a front end section. The joint section 361 is joined to the lower inner panel 232 and an upper section of a dashboard (not shown).

The hollow member 253 is thus sandwiched and reinforced by the rear section reinforcing member 243 or the front section reinforcing member 244 and the inner panel 218 from both left and right sides. Therefore, as shown in FIG. 33, the wall thickness t1 of the hollow member 253, the wall thickness t2 of the outer panel 217, and the wall thickness t3 of the inner panel 218 can be made smaller along the entirety of the front pillar 18B. Furthermore, the height h1 and the width h2 of the hollow member 253 can be made smaller. The thickness of the front pillar 18B can be dramatically reduced while ensuring an adequate stiffness of the front pillar 18B is obtained.

The wall thickness t2 of the outer panel 217, and the wall thickness t3 of the inner panel 218, the wall thickness t4 of the rear section reinforcing member 243, and the wall thickness t4 of the front section reinforcing member 244 are larger than the wall thickness t1 of the hollow member 253. In other words, a relationship $t1<t2<t3<t4$ is valid. The stiffness of the front pillar 18B can therefore be further increased.

As shown in FIGS. 21, 32, and 34, in the door opening 223 of the front pillar 18B, the seal attachment section 245 has a plurality of gap channels 347. In the front pillar 18B, the gap channels 347 are arranged at a pitch Ph along a range Lh between the rear section reinforcing member 243 and the front section reinforcing member 244. Specifically, a section of a flange surface 268a (see FIG. 34) of the first inner flange 268 of the inner panel 218 within the range Lh has an uneven shape. A concave part of the flange surface 268a has depth E. The uneven section of the flange surface 268a has a plurality of voids provided between the flange surface 268a and the first outer flange 282 of the outer panel 217. The voids form the gap channels 347. The depth of the gap channels 347 corresponds to the depth E of the concave part of the flange surface 268a.

As described above, the gap channels 347 are gaps that are formed so as to have a concave shape by plastic forming performed on the seal attachment section 245. Therefore, a large number of gap channels 347 (gaps 347) can be provided along the range Lh. Also, the flanges 268, 282 are joined to each other between adjacent gap channels 347. The joined portion is referred to as an inter-channel joint section 346. The presence of the inter-channel joint section 346 makes it possible to ensure that the stiffness of the front pillar 18B is adequate, even though the seal attachment section 245 is provided with the gap channels 347.

As shown in FIG. 34, each of the gap channels 347 functions as a channel between the closed void section 331 and an exterior, and is used when performing surface treatment on the front pillar 18B. Specifically, when a surface treatment is performed on the front pillar 18B, the front pillar 18B is immersed in an electrodeposition liquid stored in a liquid tank. The electrodeposition liquid in the liquid tank flows through the gap channels 347 and into the void section 331 as shown by arrows b1, b2. The amount of the electrodeposition liquid that flows is sufficient for coating a wall surface of the front pillar 18B within the void section 331. Therefore, the wall surface of the front pillar 18B within the void section 331 is sufficiently coated by the inflowing electrodeposition liquid.

As shown in FIGS. 33 and 35 through 37, at a front end 372 (i.e., a terminal section 372) of the hollow member 253, the outer upper wall section 264 is indented towards the inner lower wall section 261 (see FIG. 22). The indented section 173 is referred to as a first concave section 373. The first concave section 373 is located lower than an upper surface of the outer upper wall section 264. In other words, the first concave section 373 is set apart below the upper surface of the outer upper wall section 264 by a distance corresponding to the downward indentation.

Figure 36:
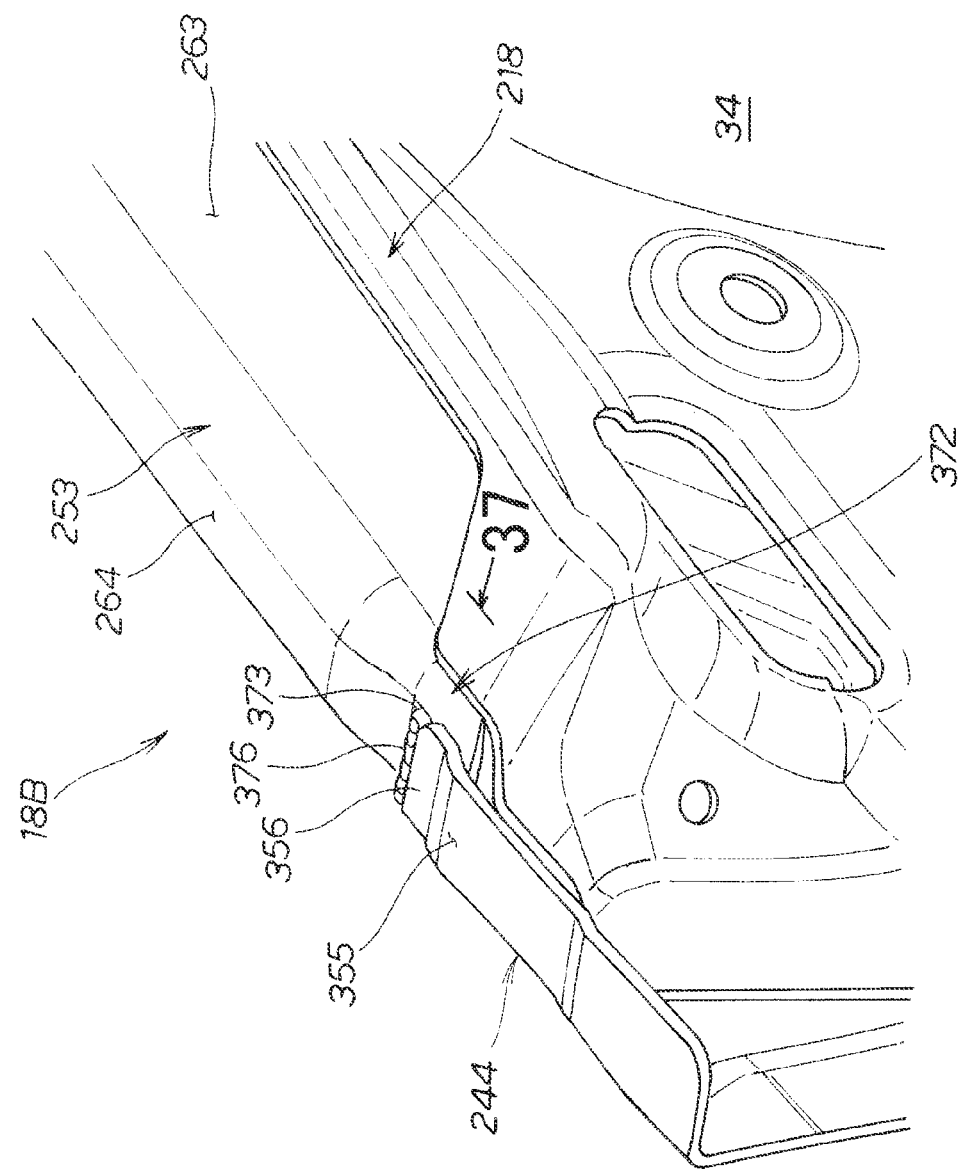
FIG. 36 is a view showing the right front pillar of FIG. 35 with an outer panel removed.
Figure 37:
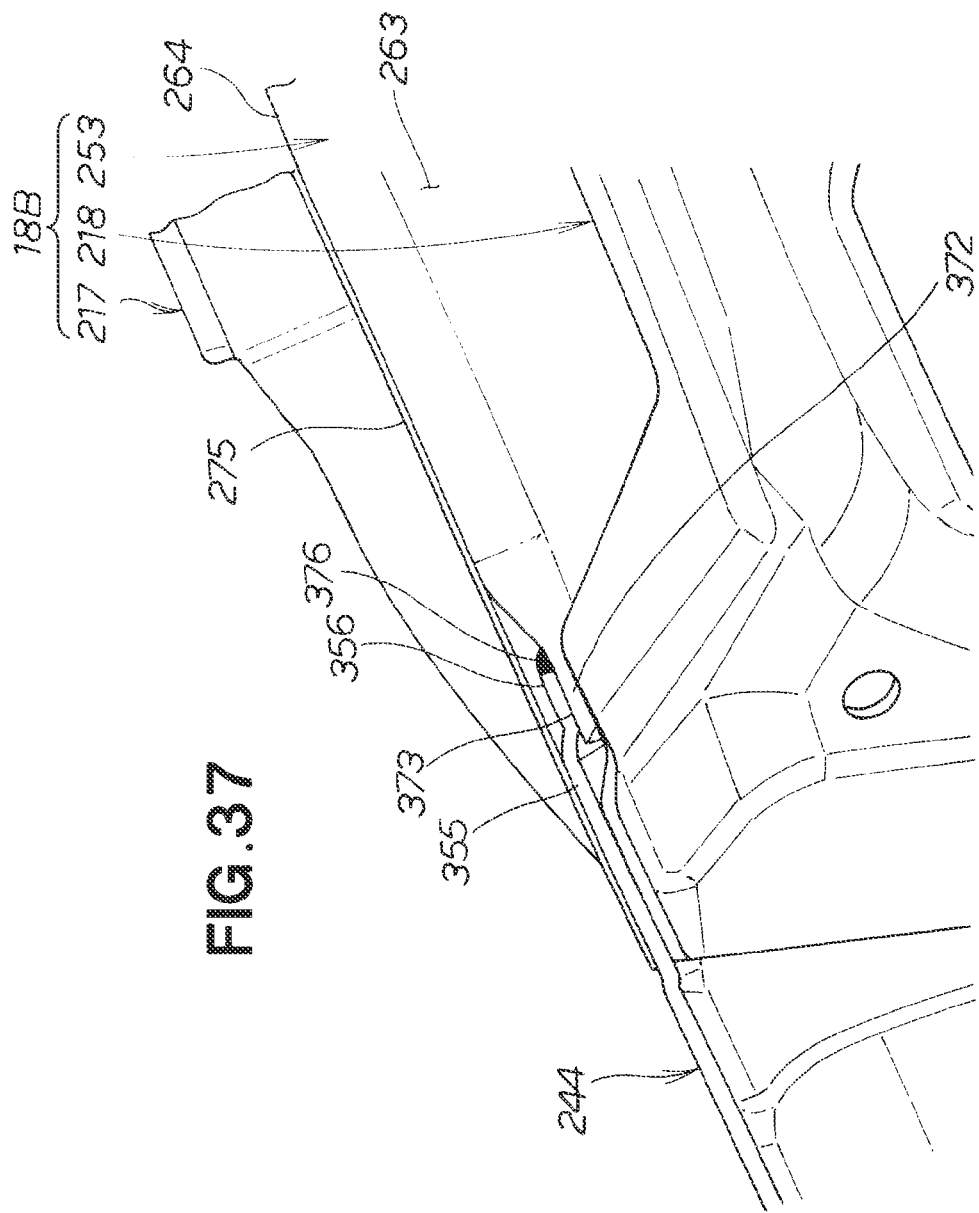
FIG. 37 is a view showing the right front pillar of FIG. 36, as seen in the direction of arrow 37.

As shown in FIGS. 35 through 37, a rear end of the front section reinforcing member 244 has an upper end portion that is folded towards the passenger compartment 34. The folded portion 355 is referred to as an upper flange 355. The upper flange 355 is a flat plate. An upper surface of the upper flange 355 is on a same level as (i.e., is coplanar with) an upper surface of the outer upper wall section 264 of the hollow member 253.

A rear end portion 356 (i.e., a joint portion 356) of the upper flange 355 is located above the first concave section 373. Also, the rear end portion 356 is indented so as to overlap the first concave section 373 from above. The indented portion 356 is referred to as a second concave portion 356. The rear end portion 356 is disposed further downwards from, and separated from, the upper surface of the outer upper wall section 264.

As described above, the wall thickness t4 of the front section reinforcing member 244 shown in FIG. 33 is larger than the wall thickness t1 of the hollow member 253, making it difficult to apply spot welding. Since the wall thickness t4 of the front section reinforcing member 244 is large, the first concave section 373 can overlap and be adequately joined to the second concave section 374 by fillet welding. In other words, the thickness t1 of the hollow member 253 and the thickness t4 of the front section reinforcing member 244 are ideal for joining using MIG welding. Fillet welding forms a welded section 376 having an adequate joint strength. Also, since the thickness t4 of the front section reinforcing member 244 is large, the terminal section 372 of the hollow member 253 can be adequately reinforced.

Meanwhile, as described above, the second outer flange 275 of the outer panel 217 is a flat plate portion extending along the upper surface of the outer upper wall section 264 to the upper flange 355 of the front section reinforcing member 244. Therefore, the windshield attachment section 275 (i.e., the windshield attachment flange section 275) is disposed so as to extend from the hollow member 253 to the lower section reinforcing member 244, and the windshield attachment section 275 and the front section reinforcing member 244 are overlapped with and joined to each other. The windshield attachment section 275 is located higher than the first and second concave sections 373, 376. Therefore, the windshield attachment section 275 does not interfere with the first and second concave sections 373, 376. Also, the windshield attachment section 275 does not interfere with the welded section 376. Therefore, the windshield attachment section 275 can be made to have a flat configuration across its entirety. The windshield 215 (see FIG. 18) can be readily and reliably attached to the flat windshield attachment section 275 using an adhesive or another common method of attachment, and the state of the attachment can be maintained to a sufficient degree.

According to the present invention, instead of a substantially rectangular shape, the hollow member 25 may have a pentagonal or another polygonal closed section, or a circular cross section, as long as a closed cross section is present.

In the second embodiment, the drain hose 124 was described as an example of a flexible linear member that is pulled out of the opening section 126 of the front pillar 18A. However, this is not intended to limit the scope of the invention, and another flexible linear member such as a wire harness may also be pulled out of the opening section 126.

Also, in the second embodiment, the stepped section 148 formed around the rim 126a of the opening section 126 may be configured so as to bulge towards the passenger compartment 34 from the lower panel section 135, instead of bulging outwards in the vehicle width direction from the lower panel section 135.

INDUSTRIAL APPLICABILITY

The present invention is suitable for an automobile having a front pillar 18, 18A, 18B in which an inner panel 29, 133, 218 is provided to a hollow member 25, 131, 253.

LEGEND 10, 10A, 10B Vehicle body
15, 215 Windscreen
18, 18A, 18B Front pillar
22 Roof
25, 131, 253 Hollow member
26, 131a, 262, 264 Wall section on vehicle exterior side
27, 131b, 261, 263 Wall section on passenger compartment side
28, 132, 217 Outer panel
29, 133, 218 Inner panel
34 Passenger compartment
45 Seal attachment section
52, 24547 Gap channels
61 Restricting concave section
243 Rear section reinforcing member
244 Front section reinforcing member
275 windshield attachment section (roof-joining outer flange section)
311 Void section
Am Automobile

The invention claimed is:

1. A front pillar for an automobile, including:
an outer panel contiguous to a roof of a vehicle body, supporting a windshield, and facing outside the vehicle body;
an inner panel facing a passenger compartment;
a hollow member sandwiched between the outer and inner panels; and
a reinforcing member,
wherein the outer panel has a glass attachment flange section extending along an edge of the windshield,
wherein the hollow member has a first concave section provided on an upper wall section thereof at a terminal end in a longitudinal direction of the hollow member, the first concave section being downwardly separated from the glass attachment flange section of the outer panel; and
wherein the reinforcing member has a second concave section welded to the first concave section and downwardly separated from the glass attachment flange section of the outer panel.

2. The front pillar according to claim 1, wherein the hollow member has, at the terminal end thereof, an outer wall section contiguous to the upper wall section and supported by the reinforcing member, and an inner wall section contiguous to the upper wall section at a side opposite to the outer wall section and supported by the inner panel.

* * * * *